United States Patent
Nguyen et al.

(10) Patent No.: US 12,223,766 B2
(45) Date of Patent: Feb. 11, 2025

(54) PROXIMITY FRAMING IN A VIDEO SYSTEM

(71) Applicant: Hewlett-Packard Development Company, L.P., Spring, TX (US)

(72) Inventors: Nhu Quynh Pham Nguyen, Austin, TX (US); Kishore Venkat Rao Goka, Leander, TX (US); Joshua Raglin, Austin, TX (US); Dhaval Patel, Austin, TX (US); Sakshi Gupta, Round Rock, TX (US); Venkateswarlu Lakkamraju, Tuam (IE); Krishna Balusu, Round Rock, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 331 days.

(21) Appl. No.: 17/971,527

(22) Filed: Oct. 21, 2022

(65) Prior Publication Data
US 2023/0401890 A1    Dec. 14, 2023

Related U.S. Application Data

(60) Provisional application No. 63/351,318, filed on Jun. 10, 2022.

(51) Int. Cl.
*G06V 40/16* (2022.01)
*G06V 10/22* (2022.01)
*G06V 20/40* (2022.01)

(52) U.S. Cl.
CPC .......... *G06V 40/161* (2022.01); *G06V 10/22* (2022.01); *G06V 20/40* (2022.01)

(58) Field of Classification Search
CPC ...... G06V 40/161; G06V 10/22; G06V 20/40; G06V 10/82; G06V 20/46; G06V 40/167; G06V 40/10; G06V 20/52; G06V 40/172; G06V 40/16; G06V 40/173; G06V 10/44; G06V 40/166; G06V 40/171; G06V 40/20; G06V 20/20; G06V 40/193; G06V 10/25; G06V 10/764; G06V 10/96; G06V 40/103;
(Continued)

(56) References Cited

U.S. PATENT DOCUMENTS

| | | | |
|---|---|---|---|
| 11,165,992 B1 * | 11/2021 | Ong | G06V 10/82 |
| 2023/0101399 A1 * | 3/2023 | Le | G06F 3/0481 |
| | | | 348/14.08 |

(Continued)

*Primary Examiner* — Nimesh Patel
(74) *Attorney, Agent, or Firm* — Quarles & Brady LLP

(57) ABSTRACT

A method may include obtaining, using a head detection model and for an image of a video stream, head detection information, where the head detection information identifies heads detected in the image. Method may also include obtaining buffer bounding boxes. Obtaining the buffer bounding boxes may include obtaining head buffer bounding boxes for the heads detected in the image, and combining at least two of the head buffer bounding boxes into a proximity buffer bounding box. The method may furthermore include identifying a set of templates based on the buffer bounding boxes. Method may in addition include creating, individually, head frame definitions for the buffer bounding boxes using the set of templates, generating an image frame definition that combines the head frame definitions, and processing the video stream using the image frame definition.

20 Claims, 27 Drawing Sheets

(58) Field of Classification Search
CPC .... G06V 40/1359; G06V 40/19; G06V 40/40; G06V 10/761; G06V 10/765; G06V 20/58; G06V 2201/07; G06V 40/168; G06V 10/10; G06V 40/18; G06V 40/50; G06V 10/20; G06V 10/40; G06V 10/70; G06V 20/53; G06V 20/64; G06V 40/165; G06V 40/174; G06V 10/809; G06V 10/7715; G06V 30/19173; G06V 2201/06; G06V 30/413; G06V 40/1388; G06V 30/14; G06V 20/80; G06V 20/653; G06V 30/147; G06V 30/1473; H04N 23/611; H04N 7/15; H04N 7/147; H04N 7/152; H04N 23/90; H04N 7/142; H04N 7/144; H04N 7/181; H04N 23/00; H04N 1/3876; H04N 13/366; H04N 13/00; G06T 7/50; G06T 2207/10016; G06T 2207/10028; G06T 2210/12; G06T 2207/20084; G06T 2207/30196; G06T 7/11; G06T 2207/20081; G06T 2207/30201; G06T 7/73; G06T 2207/30232; G06T 2207/30242; G06T 7/55; G06T 2207/10004; G06T 2207/20021; G06T 5/60; G06T 7/292; G06T 15/205; G06T 11/00; G06T 15/00; G06T 7/74; G06T 7/285; G06T 7/75; G06T 19/20; G06T 7/70; G06T 17/00; G06T 13/40; G06N 3/045; G06N 3/09; G06N 7/01; G06N 20/00; G06N 3/08; G06N 20/10; G06N 3/0464; G06N 3/096; G06N 5/02

See application file for complete search history.

(56) References Cited

U.S. PATENT DOCUMENTS

| | | | |
|---|---|---|---|
| 2023/0247073 A1* | 8/2023 | Yu | H04N 7/147 348/14.08 |
| 2024/0054786 A1* | 2/2024 | Andresen | H04N 5/2628 |
| 2024/0104699 A1* | 3/2024 | Master Ben-Dor | G06T 3/40 |
| 2024/0137641 A1* | 4/2024 | Bhatt | G06T 7/50 |

* cited by examiner

PROXIMITY FRAMING IN A VIDEO SYSTEM

CROSS REFERENCE TO RELATED APPLICATIONS

This application is a non-provisional application claiming benefit under 35 U.S.C. § 119(e) to U.S. Pat. App. Ser. No. 63/351,318 filed on Jun. 10, 2022, which is incorporated herein by reference in its entirety.

BACKGROUND

Video systems capture and process video streams. A video stream is a sequence of images captured by at least one camera. For example, a video system may be a conferencing system or a part of a conference system, or a video system may be used to capture a video stream for later playback. In some cases, the video system uses a video stream from one or more cameras, where the video stream is of multiple people in a same room. In such a scenario, the video system may perform framing operations to modify the video stream. Framing operations changes the view of a video stream, such as by cropping the images and zoom in on a portion of the images.

SUMMARY

In one general aspect, a method may include obtaining, using a head detection model and for an image of a video stream, head detection information, where the head detection information identifies heads detected in the image. Method may also include obtaining buffer bounding boxes. Obtaining the buffer bounding boxes may include obtaining head buffer bounding boxes for the heads detected in the image, and combining at least two of the head buffer bounding boxes into a proximity buffer bounding box. The method may furthermore include identifying a set of templates based on the buffer bounding boxes. Method may in addition include creating, individually, head frame definitions for the buffer bounding boxes using the set of templates, generating an image frame definition that combines the head frame definitions, and processing the video stream using the image frame definition.

In one general aspect, system may include a video processor having a head detection model configured to generate head detection information for an image of a video stream, where the head detection information identifies heads detected in the image, and a frame generator configured to generate head frame definitions for an image of an input video stream. Generating the head frame definitions may include obtaining, using a head detection model and for an image of a video stream, head detection information, where the head detection information identifies heads detected in the image and obtaining buffer bounding boxes. The obtaining the buffer bounding boxes may include obtaining head buffer bounding boxes for the heads detected in the image, and combining at least two of the head buffer bounding boxes into a proximity buffer bounding box. Generating the head frame definitions may also include identifying a set of templates based on the buffer bounding boxes, and creating, individually, the head frame definitions for the buffer bounding boxes using the set of templates. System may in addition include an image framing processor configured to process the video stream using the image frame definition.

In one general aspect, method may include obtaining, using a head detection model and for an image of a video stream, head detection information, where the head detection information identifies heads detected in the image. Method may also include obtaining buffer bounding boxes, where obtaining the buffer bounding boxes may include obtaining head buffer bounding boxes for the heads detected in the image, and combining at least two of the head buffer bounding boxes into a proximity buffer bounding box. Method may furthermore include identifying a set of templates based on the buffer bounding boxes. Method may in addition include creating, individually, head frame definitions for the buffer bounding boxes. Method may moreover include processing the video stream using the head frame definitions.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

Figure 1:
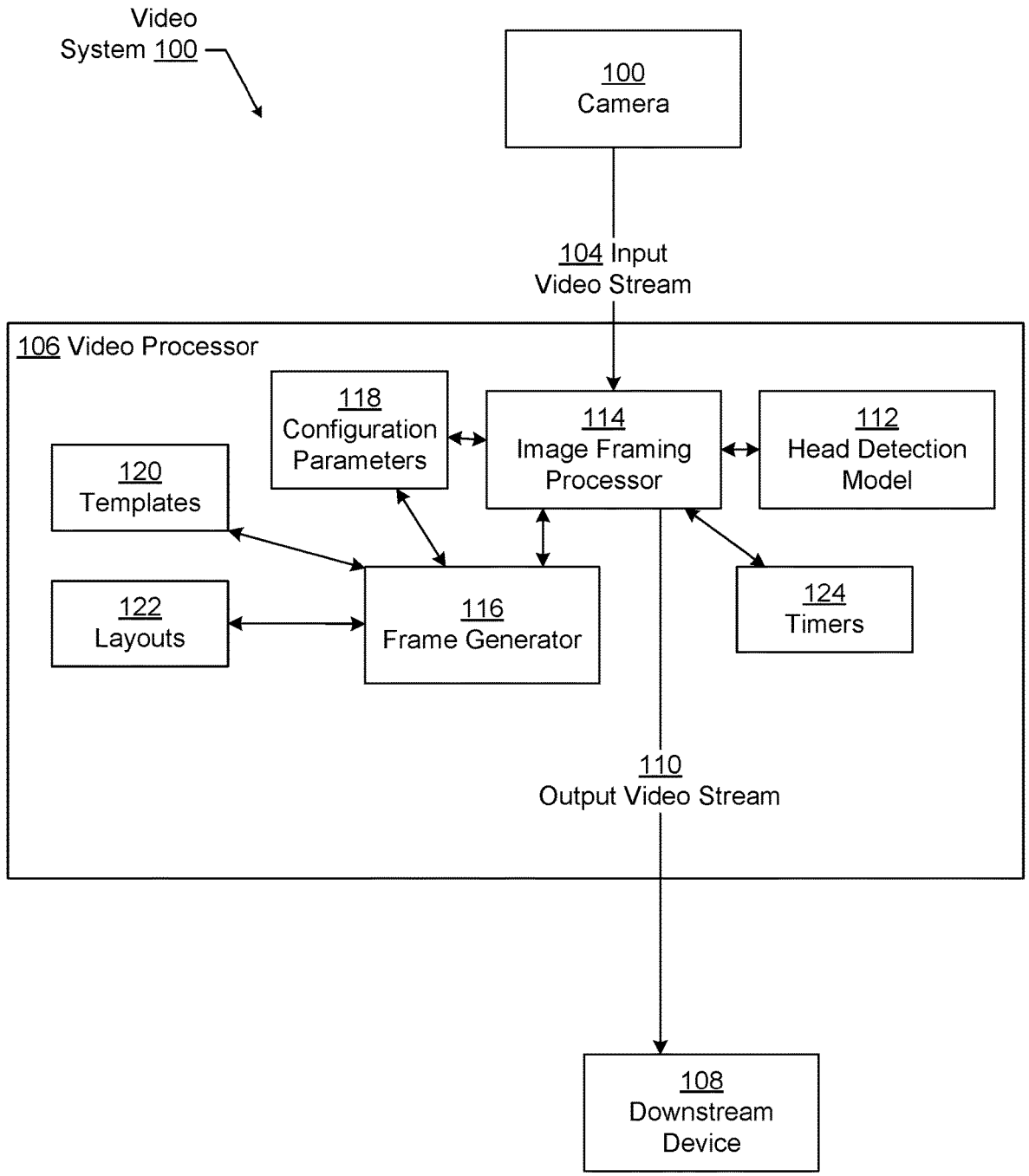
FIG. 1 shows a diagram of a system in accordance with one or more embodiments.

In general, embodiments of the disclosure are directed to performing, by a video system, proximity framing of multiple heads in conference room. The video system is any system in which a video stream is captured by a camera, such as a conference call, video recording, or a live single room conference or gathering which is captured by a camera. A frame is portion of an image of a video stream. Specifically, a frame is a sub-image of an image of the video stream. Specifically, many room cameras for conference rooms have field of view that covers substantially the whole room. Thus, when people are in meetings in a conference room, the conference rooms camera captures whole room view. However, people in the conference room may be small comparative to the whole room view and an uneven size as compared to each other. For example, people further away from the camera may be small while people close to the camera are larger. The sending of the whole room view creates an experience far end where the end user sees much of the room environment (i.e., unused areas of the room), some larger heads of some people and some smaller heads of the people further in the room. This creates a meeting inequity whereby a focus is on some participants and less focus is on other participants that are away from the camera.

Proximity framing is a framing technique that groups individuals into a same frame based on being proximate to each other in a conference room. Thus, in proximity framing, individuals that are not in proximity to each other are in separate frames (e.g., in a frame by themselves or in a separate group of people). Proximity framing includes generating head frames. A head frame may be a single head frames and a proximity frame. Single head frames are multiple frames for the different people in a conference room, whereby the focus of the frame is a single person's head. With single head frame, an individual person in the conference may have their own frame, even though the conference room has multiple people.

Proximity frames are frames that creates multiple frames for the different subsets of people in a room based on a proximity of the people to each other. The focus of the frame is the subset. Proximity frames may have two or three people that are close in proximity in the room. The proximity framing will frame those two or three people as one group for a more optimal viewing experience.

In proximity framing, a subset of people that satisfy proximity criteria are in the same frame and other subsets or individuals may be in different frames. For example, the other individuals may be in their own proximity frame or single head frame.

The multiple individual frames of the conference room are concurrently transmitted. In at least some embodiments, the concurrent transmission is grouping the head frames into an image frame.

To perform proximity framing, one or more embodiments use a machine learning model that identifies the heads of people in the room from an image. For each head, a head buffer bounding box is obtained. Head buffer bounding boxes that are determined to be in proximity to each other are combined into a proximity buffer bounding box. Thus, buffer bounding boxes include at least one proximity buffer bounding box and may include single head buffer bounding boxes. The buffer bounding boxes are each used with a corresponding template to define the location and the zoom level for the head frame. The location and the zoom level for the head frame is added to a head frame definition.

The collection of head frame definitions define which portions of an image of a video stream is transmitted and which portions of the video stream is not transmitted. Notably, while each portion is contiguous in a particular head frame, the portions may be separate or overlapping from each other portion. Thus, the head frame definitions may be applied to a video stream to generate an output video stream to send to a downstream device.

Figure 3:
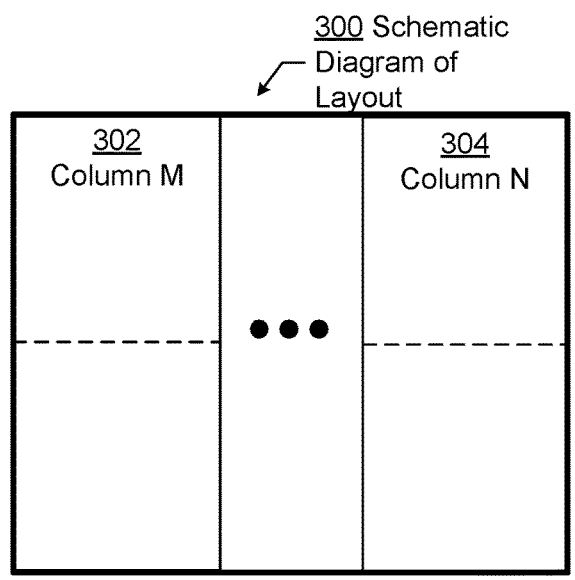

FIG. 1 is a diagram of a video system (100) in accordance with one or more embodiments. As shown in FIG. 1, the video system (100) may include a camera (102) connected to a video processor (106). The camera (102) may correspond to any type of camera that captures an input video stream (104), such as a webcam, a conference endpoint camera (e.g., as shown in FIG. 3), a standalone camera, or any other type of camera.

The camera (102) is communicatively connected to a video processor (106). The video processor (106) includes hardware or software that is configured to process the input video stream (104) and produce the output video stream (110). For example, the video processor (106) may be a computing system or an application in memory or on a non-transitory computer readable medium, such as described in FIG. 4. As another example, the video processor (106) may be a hardware processor, associated memory, and firmware integrated into the housing of the camera (102). As another example, the video processor (106) may be a conference system server or a component thereof that is an intermediary between the conference endpoints. As another example, the video processor (106) may be a video editing application. Other types of video processors may be used without departing from the scope of the disclosure.

Continuing with FIG. 1, the input video stream (104) is a video stream that is input into the video processor. The use of the term "video stream" corresponds to a standard definition used in the art. Namely, the video stream includes a sequence of images ordered in time from a continual video capture by the camera (102). If multiple cameras are present, the multiple cameras may create a single video stream that includes, for example, additional information such as depth. The video stream may include audio and other information. For nomenclature purposes, the input video stream is a sequence of input images, and the output video stream has a sequence of output images.

The output video stream (110) is a video stream that is output produced by the video processor (106). The images in the video stream include output frames. An output frame may focus the view in the camera on a single individuals (i.e., head frames), group of individuals (i.e., group frame), or subgroup of individuals based on proximity (i.e., proximity frame). A group frame is a framing technique in which a single output image shows the group of the individuals in the conference room as a contiguous image. When group framing is performed, the sequence of images is each a group frame. The group frame may include all participants (i.e., group members or members of the group) as a single unbroken image regardless of proximity to each other. For other types of framing such as head framing and proximity framing, a single output image may include multiple frames, where each of the multiple frames is a sub-image that corresponds to a single portion of the video stream captured by the camera.

In the output video stream, an output image may be a composite of the frames that form the output image to form a single image. In such a scenario, from the downstream device perspective, the output image of the output video stream appears as a single image within the video stream. As another example, the frames of an output image may be encoded and transmitted as separate images to be combined by the downstream device (108). In such a scenario, the positioning of the frames within the output image may be specified as metadata with the separate images.

The video processor (106) may include additional components for other type of processing. For example, the additional processing may include filtering, various detection operations, and other operations. The additional processing may be performed as a preprocessing, at the same time, or in parallel with the processing described in the present application.

The video processor is communicatively interposed between the camera (102) and the downstream device (108). The downstream device (108) may be a storage device, a conference endpoint, a conferencing system server that is an intermediary between two or more conferencing endpoints, a computing system, or other device that receives the output video stream (110).

Returning to the video processor (106), the video processor (106) includes a head detection model (112), an image framing processor (114), a frame generator (116), templates (120), timers (124), and configuration parameters (118). Each of these components is described below.

The head detection model (112) is a machine learning model that is trained to detect heads in an image of the input video stream (104). The head detection model (112) may be, for example, a convolutional neural network that operates on an image (e.g., an image extracted from the input video stream (104)). The head detection model (112) may use information from sub-sequence of images in the input video stream (104). The output of the head detection model (112) includes the locations of the heads of people in the image. For example, the locations may be denoted by bounding boxes around the heads of people in an image. Although a head detection model is described, a face detection model or a person detection model may be used without departing from the scope of the technology.

The image framing processor (114) is connected to the head detection model (112). The image framing processor (114) uses the location of the head detection model to determine whether an initial framing or re-framing should be performed. An initial framing may be performed based on configuration parameters (118) or the output of the head detection model. Reframing may be performed based on configuration parameters (118), the number of people detected in a room as output by the head detection model (112), movement of people (e.g., within the frames or into or out of the frames or conference room), and timers (124).

The timers (124) may be hardware or software timers that are each configured to trigger an event when a certain amount of time has elapsed. The timers (124) are frame timers specifying when to reframe. The initiation of the timers is triggered by the detection of an event by the image framing processor (114). Different timers may have corresponding different event types. A first timer may correspond to a detection of a person leaving a head frame and staying within the room. For example, the person may be detected in images of the input video stream as being outside the head frame. A second timer may correspond to a detection of a person leaving the head frame and the room. For example, the person may no longer be detected in images of the input video stream. A third timer may correspond to a detection of a person entering the room. A fourth timer may correspond to the detection of the person being off-center of the head frame. Off-center means that the person's head is no longer in the location for the head as specified as corresponding to the template. A fifth timer may correspond to people moving to be in proximity with each other or and a sixth time may correspond to people moving out of being in proximity with each other.

If the image framing processor (114) determines to perform reframing, the image framing processor (114) may trigger the frame generator (116). If the image framing processor (114) determines that an initial framing or reframing should not be performed, then the image framing processor (114) may use the prior output (e.g., the head frame definitions and image frame definitions) of the frame generator (116) to generate the output images in the output video stream (110). In some cases, the reframing may be a complete reframing, by determining a layout and generating new head frame definitions for the heads. In other cases, such as in the case of the head being detected off-center, the reframing is only on the corresponding head frame definition.

The frame generator (116) uses, as input, an input image and locations of people specified by the head detection model (112). The frame generator (116) generates head frame definitions and an image frame definition as output. The head frame definition defines the boundaries of each frame within the input image and zoom level for each frame. In particular, for a head or subset of heads that are in proximity (i.e., a proximity group), the head frame definition specifies the sub-image of the input image that forms the frame as well as the zoom level for the sub-image. Thus, the head frame definition may be a bounding box for each frame, a zoom level, and the position.

The image frame definition identifies each of the head frame definitions and assignments of the head frame definitions to locations in the image frame. Specifically, the image frame definition identifies, for each particular head frame definition, the particular position to place the head frames corresponding to the head frame definition.

Figure 2:
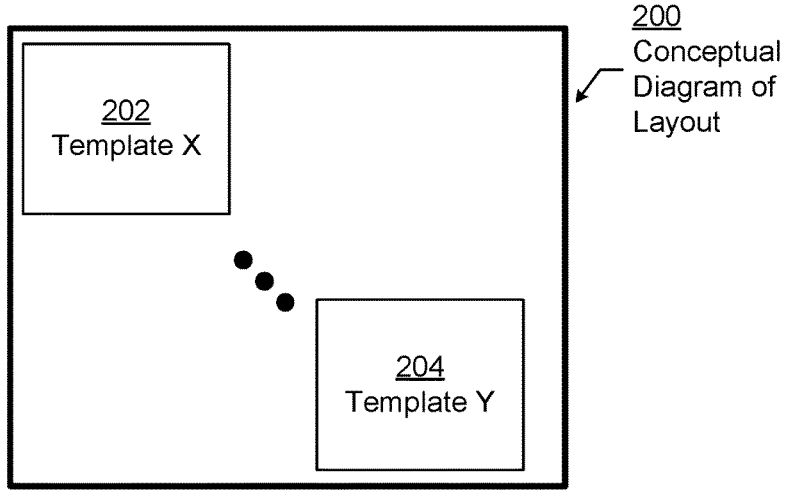
FIGS. 2 and 3 show a layout in accordance with one or more embodiments.

The frame generator (116) may include or generate image frame layouts (122) and sets of templates (120). In one or more embodiments, the image frame layouts (i.e., layout) defines how head frames fit into the dimensions of an image of the video stream that is transmitted. For example, if the dimension of the image is 16:9, then the image frame layout specifies a layout of the 16:9 region. Other dimensions may be used. FIG. 2 shows a conceptual diagram of a layout (200). Turning briefly to FIG. 2, a layout (200) specifies different layouts of head frames as defined by the corresponding head frame templates (e.g., head frame template X (202), head frame template Y (204)) in an output image. Specifically, the layout (200) specifies the set of head frame templates (described below) and the location of each head frame template in the set.

The video processor (106) may generate or have multiple layouts, whereby each layout corresponds to a number of heads and positions of heads within the image. The positions are the locations of the heads with respect to each other. Thus, a particular layout is specific to the number of heads and to positions of heads in the image extracted from the input stream. For example, if six heads are detected in the image and two of the heads are proximate to each other, then the corresponding layout specifies positions for five head frames, which include one proximity head frame and four single head frames. If four heads are detected in the image where pairs of heads are proximate to each other, then the layout specifies two head frames that are both proximity frames.

FIG. 3 shows a schematic diagram of a layout (300) in accordance with one or more embodiments. In one or more embodiments, a layout divides the image frame into columns (e.g., column M (302), column N (304)). For example, the layout may divide the image frame into two, three, or four columns. Columns may be the same size or different sizes. Columns may be further divided into rows. Further, columns may e individually divided, whereby some columns are divided into rows and other columns are whole. For example, the layout may specify positions for five head frames. The five head frames include four head frames located in two columns of two rows and one head frame that is an entire column. The location of the column head frame may be in the middle, left or right of the two other columns of head frames based on the location of the people in the room. For example, if two people are sitting in the middle proximate to each other, then those people are in a single column head frame in the middle. Similarly, if the arrangement is one person on the left and two people in the center, and two people proximate to each other on the right, then the column head frame may be on the right.

Figure 4:
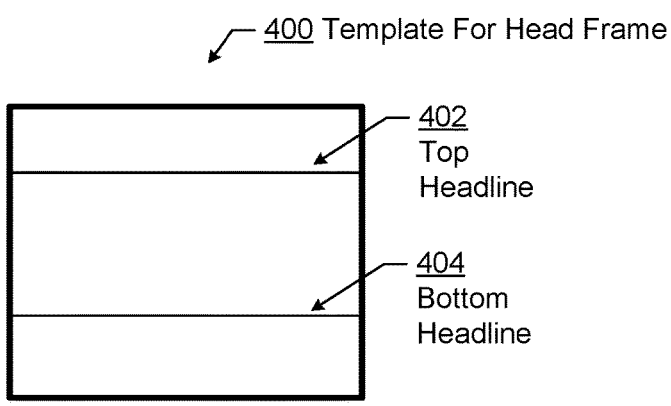
FIG. 4 shows a diagram of a template in accordance with one or more embodiments.

Returning to FIG. 1, the templates (120) are head frame templates. A head frame template may be a proximity frame template for a proximity frame or a single head frame template for a single head frame. A head frame template describes the dimensions of the head frame and the positioning of the buffer bounding box within the head frame. Specifically, the head frame template defines how a sub-image of the original image is to fit within a frame. FIG. 4 shows a schematic diagram of a head frame template (400). The dimensions of each template may differ depending on the template. Similarly, the locations of the alignment lines may differ. As shown in FIG. 4, a template (400) includes a top headline (402) and a bottom headline (404). The top headline (402) is defined to align with the top buffer of a buffer bounding box. Similarly, the bottom headline (404) is defined to align with the bottom buffer of the buffer bounding box. Other guiding lines may be used to align the buffer bounding boxes, and correspondingly head(s), within the frame. For example, a center crossing line may be used, side lines, or other types of lines.

Although FIG. 1 presents the image framing processor (114) and the framing generator (116) as separate components, the image framing processor (114) and frame generator (116) may be combined into a single component that operates as a single unit. Further, the template (120) may be part of the frame generator (116).

Figure 5:
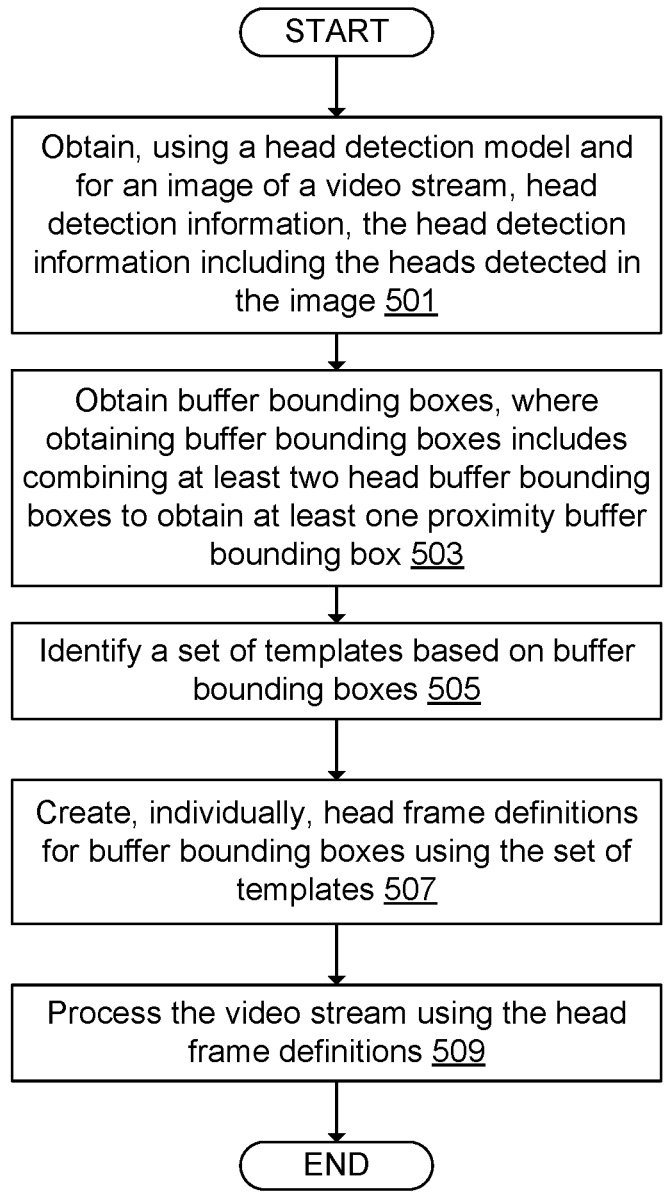
FIGS. 5, 6, 7, and 8 show flowcharts in accordance with one or more embodiments.

FIG. 5 is a flowchart in accordance with embodiments of the disclosure. In Block 501, using a head detection model and for an image of a video stream, head detection information is obtained. The image framing processor passes an image frame to the head detection model. The head detection model is a convolutional neural network that processes the image features of the image to detect the locations of the heads in the image. The output of the head detection model is passed to the frame generator.

In Block 503, buffer bounding boxes are obtained, where obtaining the buffer bounding boxes includes combining at least two head buffer bounding boxes to obtain at least one proximity buffer bounding box. The head detection information identifies each head of the image and the location of each head. Proximity rules are applied to the locations of buffer bounding boxes in order to determine which heads are proximate to each other. For example, the distances between head buffer bounding boxes may be compared to one or more proximity rules to determine if the head buffer bounding boxes are proximate to each other. As another example, an alignment between head buffer bounding boxes may be compared to the one or more proximity rules to determine if the head buffer bounding boxes are proximate to each other. Other operations may be performed. Multiple subsets of head buffer bounding boxes may be individually combined into separate proximity buffer bounding boxes.

The proximity buffer bounding box fits the entirety of each head buffer bounding box that is combined into the proximity buffer bounding box. Thus, combining the head buffer bounding boxes may be performed by using the outer edges of the corresponding head buffer bounding boxes. For example, the proximity buffer bounding box may have a top edge matching a top edge of a topmost head buffer bounding box, a bottom edge matching a bottom edge of a bottom most head buffer bounding box, a left edge matching a left edge of a left most head buffer bounding box, and a right edge matching a right edge of a right most head buffer bounding box. The proximity buffer bounding box may be a rectangle.

In Block 505, the set of templates is selected based on the buffer bounding boxes. The templates are selected based on the location of the buffer bounding boxes in the image. Buffer bounding boxes are assigned to locations in the layout in the image according to the locations of the buffer bounding box. Each location has a corresponding size, and the corresponding size matches a template.

In Block 507, individually, the head frame definitions are created for buffer bounding boxes using the set of templates. The buffer bounding boxes are matched to templates. Serially or in parallel with each other for the buffer bounding boxes, the head frame definition is generated for the buffer bounding box using the template. The edges of the buffer bounding boxes are aligned to the template. Zooming and cropping may be performed so that the buffer bounding box matches the alignment lines specified by the template. The result is a head frame definition that defines the zoom amount and the location within the image (e.g., bounding box for the head frame with zoom amount). The head frames may have heterogenous zoom amounts. Specifically, head frame definitions for people farther from the camera may have an increased zoom amount as compared to head frame definitions for people closer to the camera. For each head, a head frame definition is created. Because, in some embodiments, head frame definitions are created individually from the image and consider the whole image rather than portions thereof, the head frame definitions may be overlapping.

In Block 509, the video stream is processed using the head frame definitions. For each image of the video stream, the portions of the image are selected and zoomed as defined by the corresponding head frame definitions to create head frames. The head frames may be transmitted to the downstream device.

If image frames are sent rather than individual head frames, the head frames are placed in an image frame in the locations defined by the image frame definition. The image frame is then transmitted to the downstream device. The image framing processor continues to process the images to generate the output frames. Each image of the video stream is adjusted as defined by the image frame definition to present the heads.

During video conferencing (e.g., an active conference call between endpoints), the video stream for the participants in the conference room is adjusted in real time to create an output stream having head frames. The video processor monitors the head frames and the image to determine whether reframing should be performed as described above. Thus, the heads are reframed as people move in and around the room or people enter or leave the room.

Figure 6:
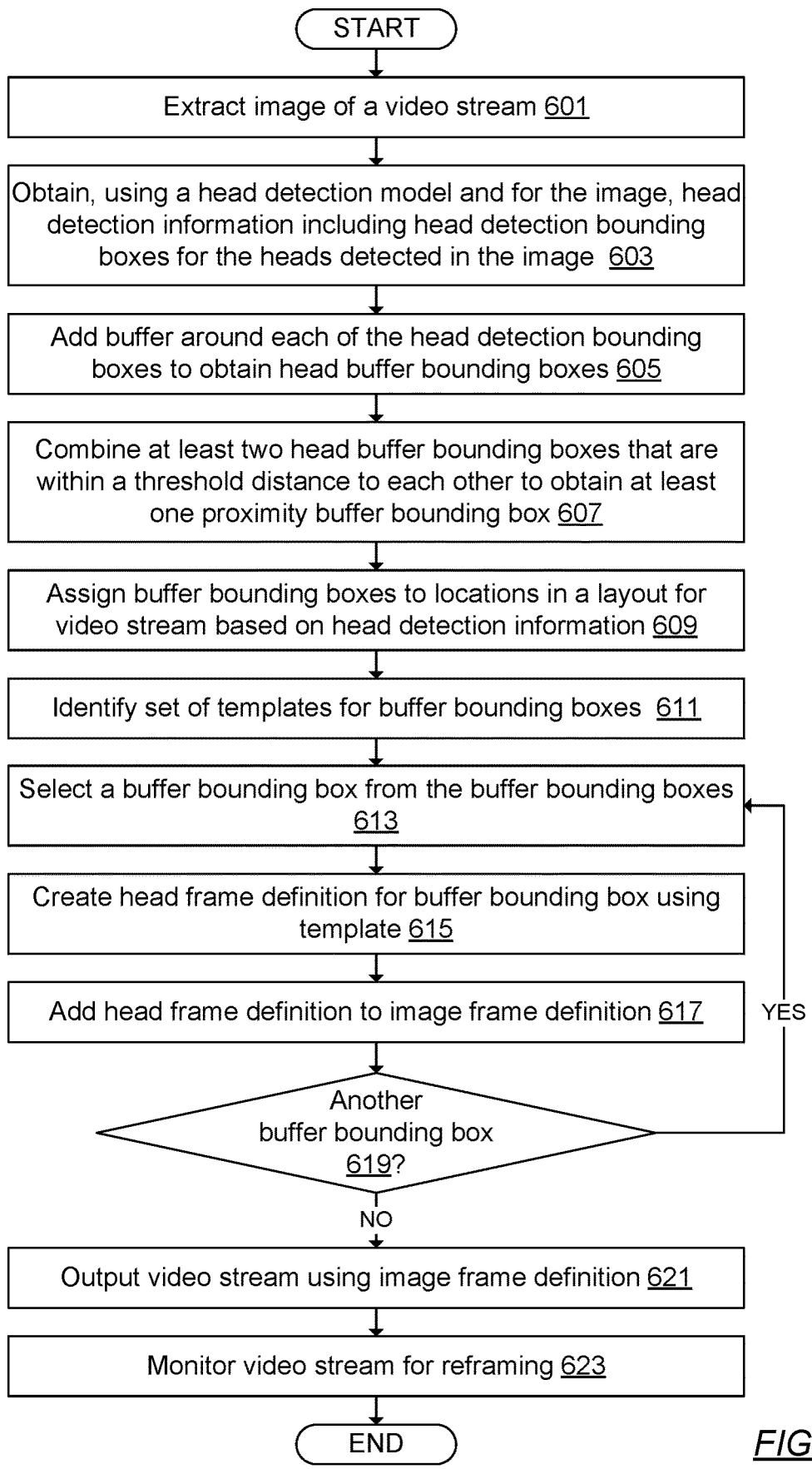

FIG. 6 shows a method of performing image framing that is more detailed than FIG. 5. Other techniques besides those describe in FIG. 6 may be used without departing from the scope of the technology. Further, in some implementations, some of the operations of FIG. 6 may be omitted or modified. In Block 601, an image of a video stream is extracted. The camera captures the video stream in real time and passes the video stream to the video processor. The video processor processes the video stream before sending the video stream to the downstream device. In the video processor, the image frame processor extracts an image from the video stream for processing. In some embodiments, the extracting of the image is a sampling of the video stream performed at a predefined interval, such as at a defined number of microseconds. Thus, at each elapse of the predefined interval, the image frame processor extracts an image for separate processing and continues to perform framing of the video stream according to the current configuration. The framing is performed by the image frame processor cropping and zooming into different parts of each image of the video stream according to the current configuration. Initially, the cropping and zooming is a default configuration. However, when a frame definition (e.g., head frame definition) is generated from the frame generator, the frame definition is applied by the image framing processor to the stream. Because a live conference call is occurring, the processing is performed quickly so as to be applicable to the current configuration of the participants being displayed. Thus, the processing described in FIG. 6 is performed in real-time to create new head frame definitions.

In FIG. 6, the image that is extracted shows heads of members of the conference (i.e., participants or people in the conference). However, the video processor has not yet detected that the image shows the heads or the configuration of the participants.

In Block 603, head detection bounding boxes are obtained for the image of the video stream. The head detection information identifies the heads detected in the image. The image frame processor transmits the image to the head detection model that is a convolutional neural network. The convolutional neural network processes the pixel values of the image through several layers to classify different parts of the image as corresponding to heads. The head detection model then outputs bounding boxes around the heads of the image. For example, the bounding boxes may be a starting coordinate, a length and a width or opposite corners of each bounding box.

The head detection bounding boxes are passed to the frame generator. In Block 605, the frame generator adds a buffer around each of the head detection bounding boxes. The buffer accommodates that the head detection bounding box may be too close to the head and miss ears, chins, and other close extremities of the head. Thus, the buffer may increase the height and width evenly by fifty percent. In other words, the result is a box that is twice the height and width of the bounding box.

In Block 607, at least two head buffer bounding boxes that are within a threshold distance to each other are combined to obtain at least one proximity buffer bounding box. The distances between pairs of head buffer bounding boxes are determined. If the head buffer bounding boxes overlap, or are within a certain distance from each other, then the head buffer bounding boxes are combined as described above in FIG. 5. The combination creates a proximity buffer bounding box. In some embodiments, only up to a threshold number of head buffer bounding boxes may be combined. For example, the threshold number may be three. In such an example, the system may revert to group framing or separate head framing when a fourth head buffer bounding box is determined to be in proximity.

As discussed above, a proximity buffer bounding box may be a rectangle. A proximity square may be defined for the proximity buffer bounding box. The proximity square is the top portion of the proximity buffer bounding box that has a width of the proximity buffer and a length that is the same as the width. Thus, the proximity buffer bounding box may extend past the proximity square. The purpose of the proximity square is to align the proximity buffer bounding box with the templates that are defined to align with square shaped buffer bounding boxes. Because the templates include portions below the square to show more of the person's torso, the full proximity buffer bounding box may be displayed.

Figure 7:
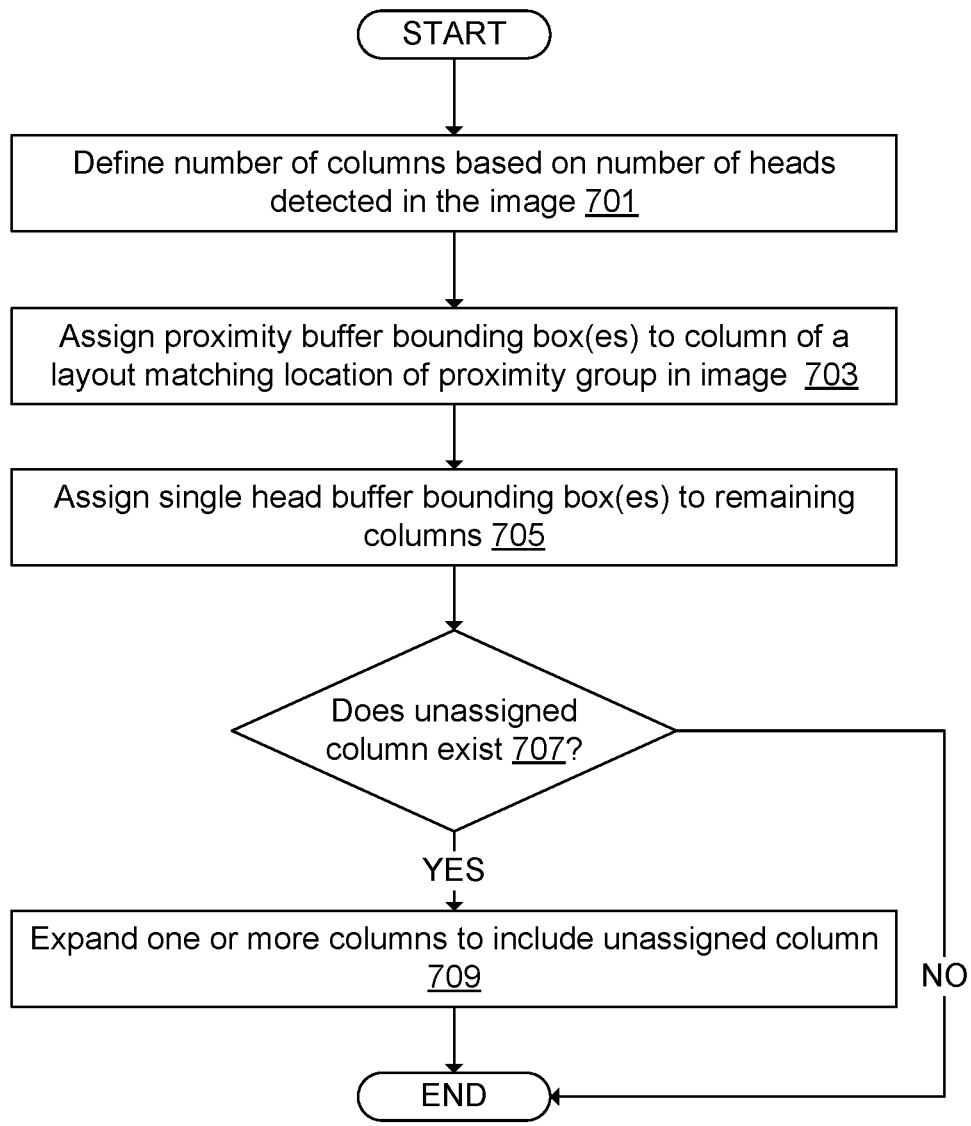

In Block 609, the frame generator assigns buffer bounding boxes to locations in the layout for the video stream based on the head detection information. The frame generator may generate a layout using the buffer bounding boxes. Generating the layout is described in FIG. 7 in one or more embodiments. Turning to FIG. 7, in Block 701, a number of columns is defined based on a number of heads detected in the image. For example, two people may correspond to head framing, three people may correspond to two columns, and four to six people may correspond to three columns. After a threshold number of people, six in the example, the system may revert to group framing. The example is only for explanatory purpose and more or fewer people or columns may be used.

Next, in Block 703, the proximity buffer bounding box(es) is/are assigned to the column(s) of the layout matching the location of the proximity group in the image. The proximity group is the group of heads that correspond to the proximity buffer bounding box. If the proximity group is on the left side, then the corresponding proximity buffer bounding box is added to the left side. If the proximity group is on the right side, then the corresponding proximity buffer bounding box is added to the right side. Otherwise, the proximity group is added to a middle column.

In Block 705, the single head buffer bounding box(es) is/are assigned to the remaining one or more columns. If more single head buffer bounding boxes exist than remaining columns, then one or more of the remaining columns may be divided into multiple rows. Single head buffer bounding boxes may be scanned from left to right in the image to create the order. According to the order, the single head buffer bounding boxes may be assigned to empty spaces of the layout in order of top to bottom, left to right. Other orders may be used.

In Block 707, a determination is made whether an unassigned column exists. Specifically, a determination is made whether an empty column exists. If an empty column exists, then the flow proceeds to Block 709. In Block 709, one or more columns are expanded to include the unassigned column. If the non-empty columns have an unequal number of heads assigned to the columns, then the column with the greatest number of heads is expanded to take up the space of the empty column in one or more embodiments. If the columns have an equal number of heads, then the columns are equally expanded to take up the space of the empty column. For example, in the case of three columns, if two of the three columns have the same number of heads and the remaining column has no heads, then the two columns are expanded to each be half the size of the image frame. However, in the case of three columns, if a first of the three columns have more heads than a second non-empty column and the remaining column has no heads, then the first column may be expanded to be two thirds the size of the image frame and the second column remains at one third the size of the image frame.

Returning to FIG. 6, in Block 611, the set of templates is identified based on the layout. Thus, regardless of whether an unassigned column exists, the generation of the layout in FIG. 7 includes the assignment of buffer bounding boxes to locations. Each location has a corresponding size (e.g., size of column and/or row). Thus, a template matches the location. The set of templates are the templates for the various locations of the layout.

In Block 613, a buffer bounding box is selected from the set of heads. For the selected buffer bounding box, a head frame definition is created using the template corresponding to the location assigned to the buffer bounding box in the layout in Block 615. Creating the head frame definition for a buffer bounding box is described in FIG. 8.

Figure 8:
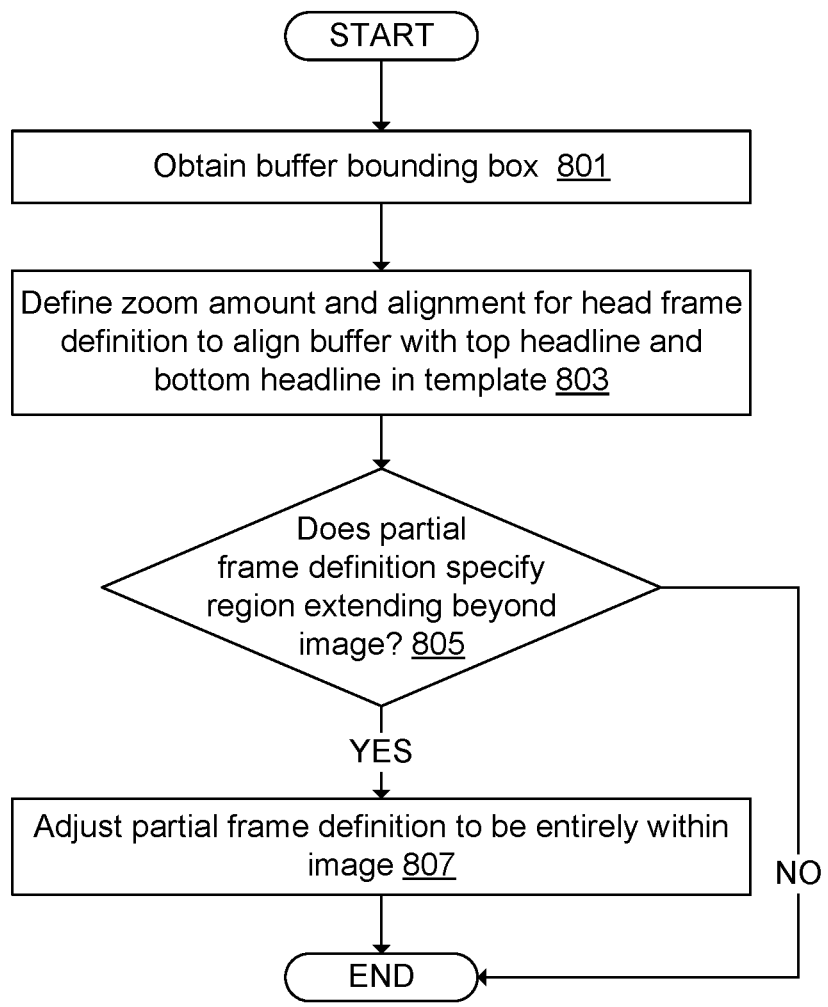

Turning briefly to FIG. 8, in Block 801, a buffer bounding box is obtained for the head from the head detection information. As discussed above, the buffer around the head detection bounding box is determined. The zoom amount and the alignment for the head frame definition is defined to align the buffer in the case of a single head buffer or the proximity square in the case of a proximity buffer bounding box with the top headline and the bottom headline in the template in Block 803. The buffer bounding box is horizontally centered in the template. The buffer bounding box is vertically aligned and the zoom amount is defined such that the top buffer aligns with the top headline and the bottom buffer, or the bottom proximity square aligns with the bottom headline. The location of the area inside of the template after the zooming and alignment is defined and added to the head frame definition.

In Block 805, a determination is made whether the head frame definition specifies a region extending beyond the image. Specifically, the determination is whether the head frame definition creates a head frame that extends beyond the boundary of the image. If not, the flow proceeds to end. If so, the flow proceeds to Block 807.

In Block 807, the head frame definition is adjusted to be entirely within the image. The adjustment may be performed as follows. A first adjustment shifts the alignment between the template and the buffer bounding box such that the buffer bounding box does not align with the alignment lines of the template but is still within the head frame. Thus, the location referenced by the head frame definition is changed by the shift amount. If the shifting is insufficient, then additional zooming may be performed until the head frame includes a region entirely within the image. The result is a revised zoom amount that increases the zoom from the current zoom specified by the template. The head frame definition is then updated with the revised location and zoom amount.

Returning to FIG. 6, the head frame definition is added to the image frame definition in Block 617. The head frame definition is added at the position defined by the image frame definition. In Block 619, a determination is made whether another buffer bounding box exists. If another head exists that is not processed, then the next buffer bounding box is processed starting with Block 613.

Once a head frame definition is created for the buffer bounding boxes in the image and added to the image frame definition, the flow proceeds to Block 621. In Block 621, the video stream is outputted using image frame definition. The image frame definition is passed to the image framing processor that adjusts the images according to the image frame definition and sends the images to the downstream device.

In Block 623, the image framing processor monitors the video stream for refreshing. Specifically, the image framing processor continues to extract images from the video stream to detect events in the video stream. For example, if the event is that a heads in a proximity frame moved away from each other, then a corresponding timer for the movement of the heads is initiated responsive to the detection. The amount of the corresponding timer is set such to account for the fact that the head(s) may immediately move back and to avoid flickering of the image. If the head(s) does not return within the elapse of the time, a reframing of the head frame definition is triggered responsive to not detecting the head in the corresponding head frame at an elapse of a threshold amount of time according to the timer.

FIGS. 7-21 show an example in accordance with one or more embodiments. FIGS. 7-21 show examples of head framing In the example, although specific numbers are used, the numbers are only for example purposes. All numbers should be considered changeable and configurable without departing from the scope of the technology. Additionally, even though measurements may be described as absolute (e.g., number of pixels) or relative (e.g., percentages of another measurement), the various measurements are not intended to be so limited. For example, measurements defined in percentage terms in the example may be defined in absolute terms while measurements defined in absolute terms may be defined in percentage terms.

Proximity framing is the framing happening in a conference room. The goal is to get meeting equity in a hybrid meeting. The meeting equity is for the people attending in the room. In one or more embodiments, the proximity framing creates meeting equity by making each person in the conference room have a substantially the same head size in the head frame while accounting for people be close to each other.

Figure 9:
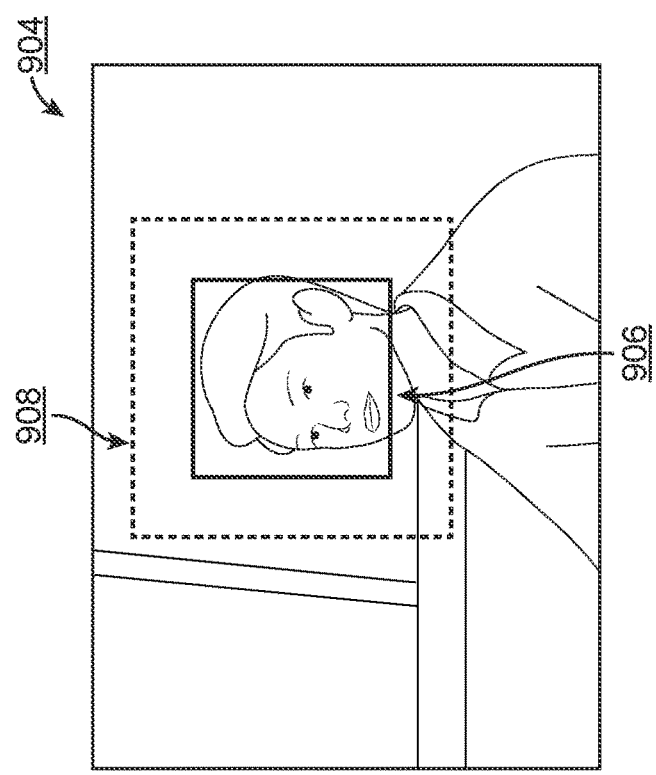
FIG. 9 shows an example of a head buffer bounding box in accordance with one or more embodiments.
Figure 9:
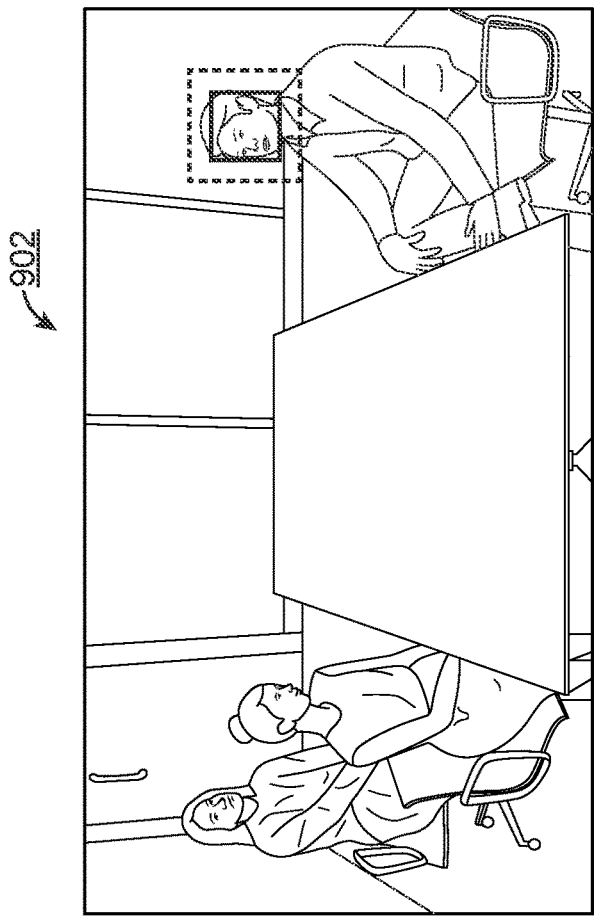

Turning to FIG. 9, in a conference room, people may be located in any location of the conference room including standing, sitting or in another position. Further, the faces of people may be directed at the camera, away from the camera, or any angle between facing the camera and away from the camera. In the example, shown in FIG. 9, the input image (902) of the conference room shows multiple people. The head detection model identifies the heads of individual people in the conference room as shown in image (904). The head detection model outputs a head bounding box as shown by the square (906). A head buffer around the head bounding box is added as shown by dashed box (908). The head buffer is defined so as to include a person's full head. In the example, the head buffer increases the head bounding box by fifty percent. The increased region that includes the head bounding box with the head buffer is referred to as head buffer bounding box and is the region of the dashed line box (908).

Figure 10:
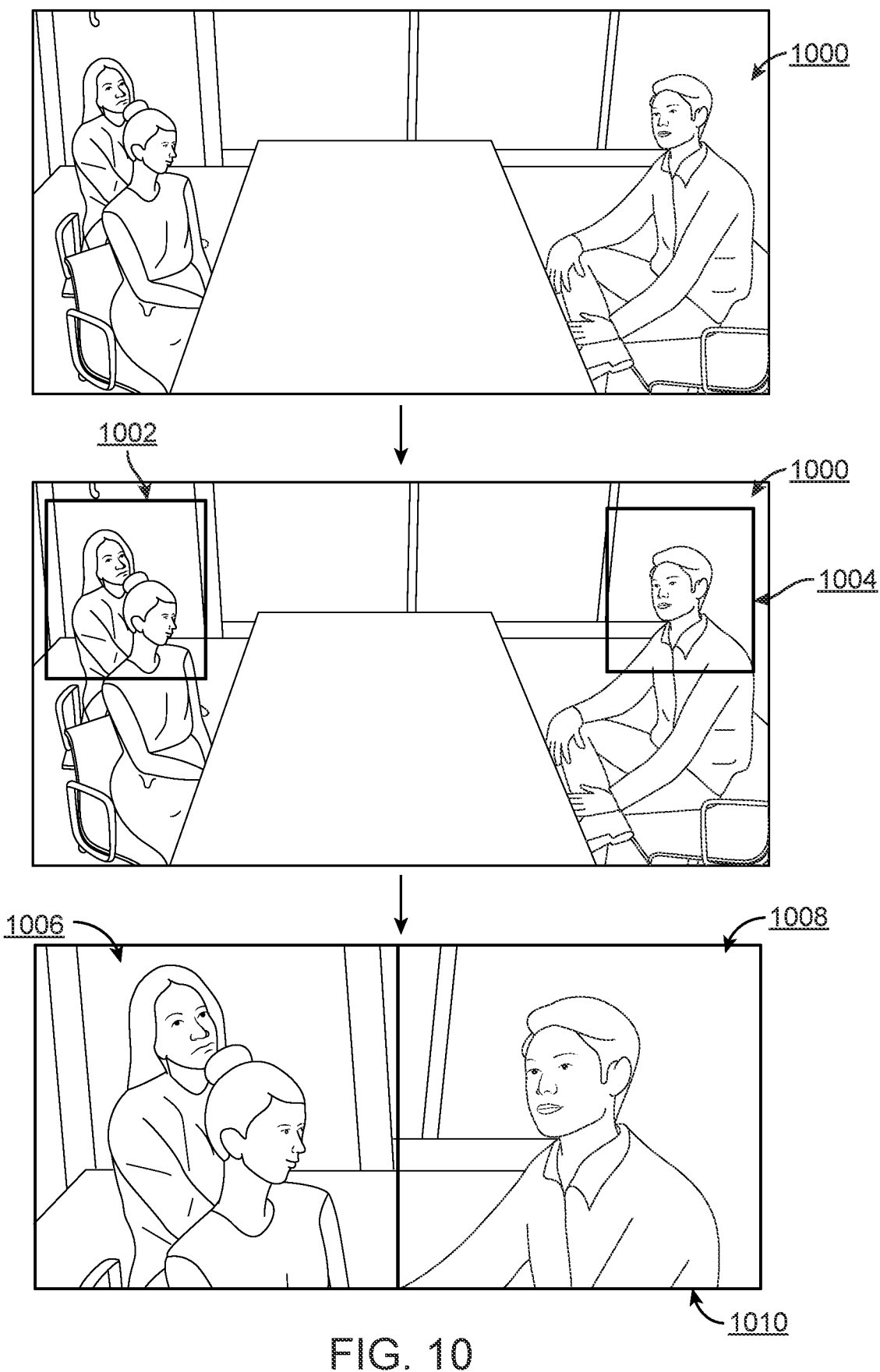
FIGS. 10 and 11 show examples of proximity framing.

FIG. 10 shows an example view of the proximity framing for image (1000). The input image (1000) in an input video stream is the camera view of the conference room. The people on the left are detected as being in proximity to each other while the person on the right is detected as being separate. The boxes (1002) and (1004) in the input image (1000) are the proximity frame (1006) and single head frame (1008) in the image frame (1010). The resulting image frame has a mixture of head frames that includes the single head frame and proximity frame. Thus, instead of seeing the whole room, people outside of the room in the conference can see the subgroups of people that are close together and individual people that are separate from the subgroup in the room as separate views.

Figure 11:
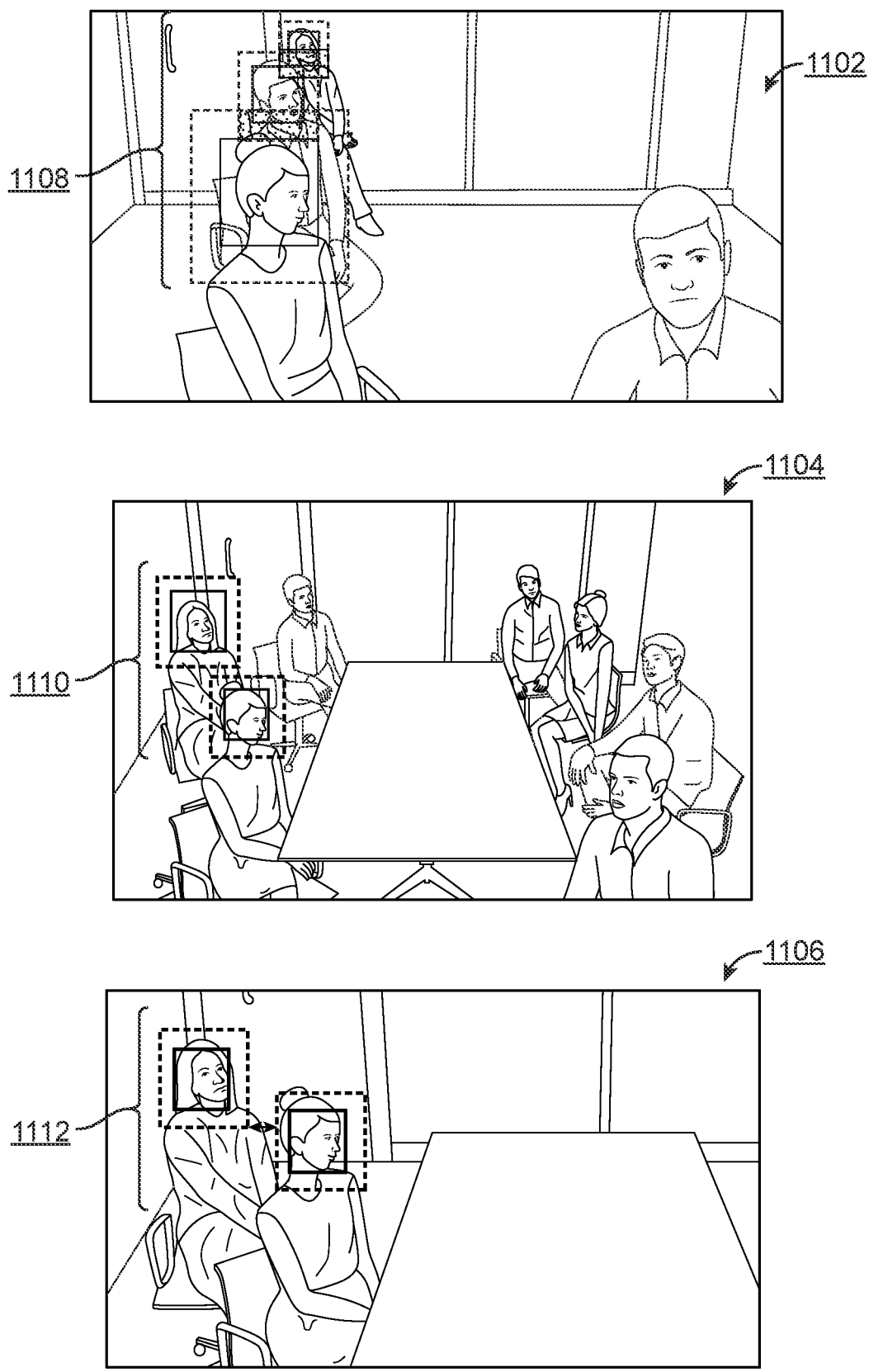

FIG. 11 shows example images (1102, 1104, 1106) that may comply with various proximity rules for combining head buffer bounding boxes into proximity buffer bounding boxes. For example, image (1102) shows a proximity group (1108) with overlapping head buffer bounding boxes. Image (1104) shows a proximity group (1110) with head buffer bounding boxes that are vertically aligned so as to be within the same column. Image (1106) shows a proximity group (1112) that are within a threshold distance to each other. The result of the proximity groups in each of the images of FIG. 11 may be a proximity buffer bounding box for the proximity group. Specifically, a proximity rule may be specified that defines one or more of the cases of FIG. 11 as corresponding to a proximity group.

A number of rules may be used for proximity framing. The rules may specify thresholds for when to perform proximity framing A first threshold may be set on the maximum number of proximity frames (e.g., only two proximity frames in the output image). A second threshold may be set as the maximum number of people in a single proximity frame (e.g., only three people frames in the proximity frame). A third threshold may be set on the maximum number of people in the room (e.g., only six people in the room). If the first, second or third threshold is exceeded, the system may revert to the group framing In group framing, the individuals in the conference room are grouped together for a single frame of the conference room as the output image.

Figure 12:
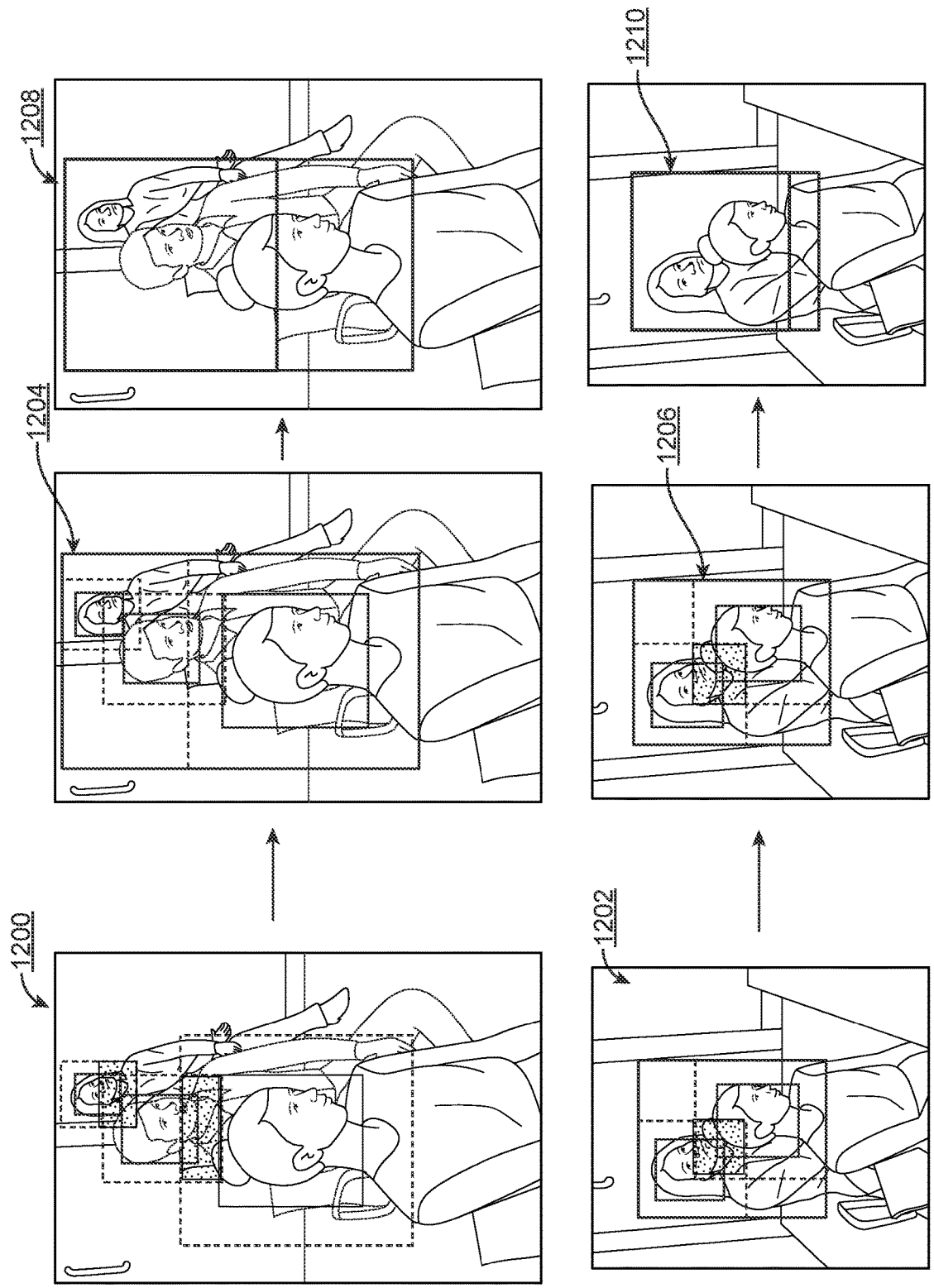
FIG. 12 shows an example of generating a proximity buffer bounding box.

FIG. 12 shows two examples of generating proximity buffer bounding boxes. When a subset of individuals is detected as being proximate to each other based on the head buffer boundary boxes as shown in portions of images (1200, 1202), a proximity buffer bounding box (1204, 1206) is created. As shown, the proximity buffer bounding box has a top boundary line of the top-most head buffer bounding box of the subset, a bottom boundary line of the bottom-most head buffer bounding box of the subset, a left boundary line of the left-most head buffer bounding box of the subset, and a right boundary line of the right-most head buffer bounding box of the subset. The proximity buffer bounding box (1204,1206) is used to define a proximity square (1208, 1210). As shown, the proximity square is a square box that is the width of the proximity detection bounding box (1208, 1210) and aligned to the top of the proximity detection bounding box (1204, 1206).

Figure 13:
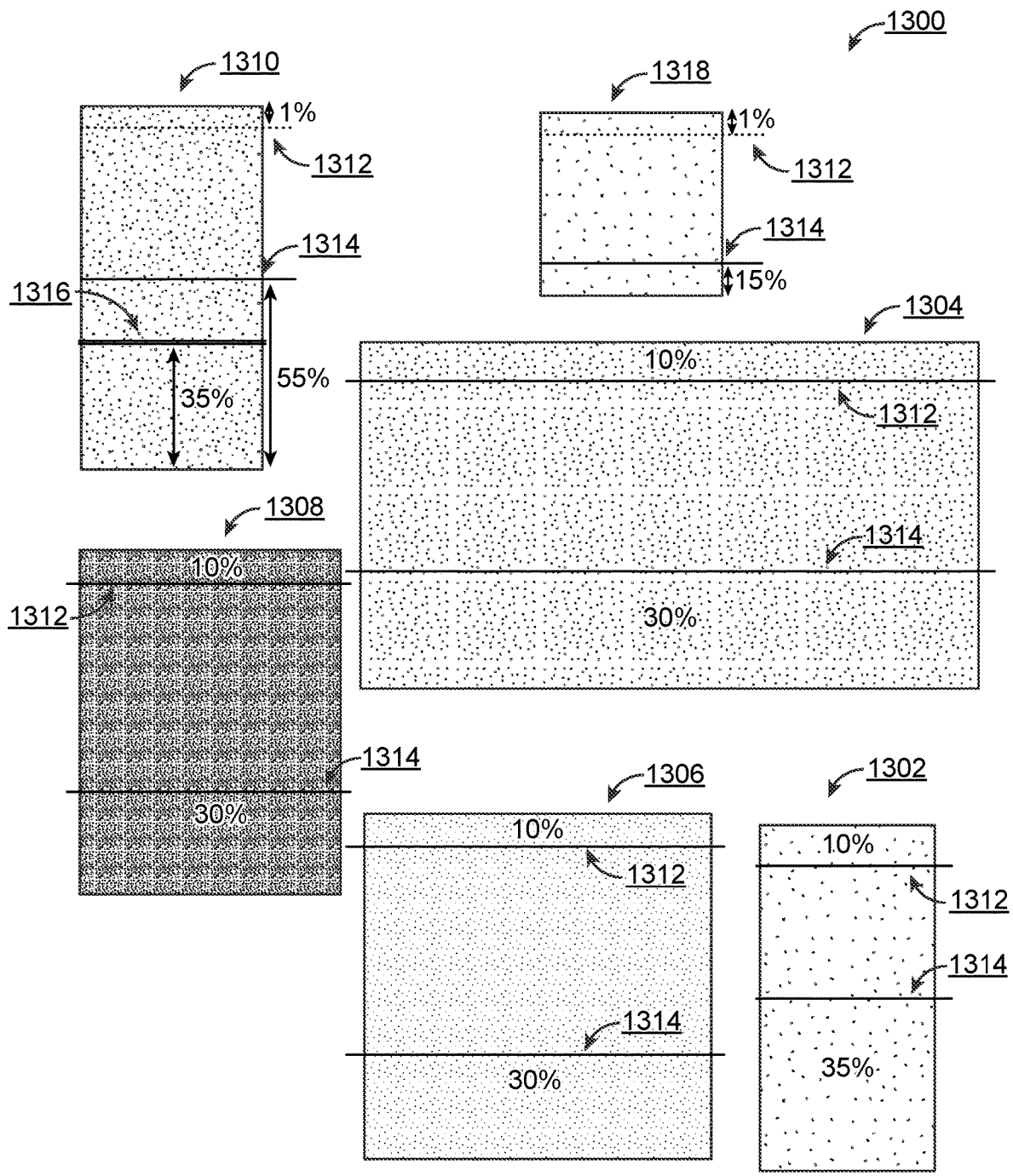
FIG. 13 shows examples of templates.

FIG. 13 shows examples of the various templates (1300) for the proximity frame based on different sizes of the proximity frame. For example, the templates include a single column proximity frame template (1302), a single wide proximity frame template (1304), a merged two thirds proximity frame template (1306), and a merged half frame proximity frame template (1308). The templates may also include single head frame templates including a single column head frame (1310) template and a square head frame template (1318). The lines in the templates are used to align the proximity square described in FIG. 13 within the frame. The top headline (1312) in each template should align with the top of the buffer bounding box. The bottom headline (1314) in each template should align with the bottom head buffer bounding box or proximity square. The off center triggers (1316) are the lines that trigger a reframing based on the head bounding box moving out of the region between the off center trigger lines as described below and later slides. The bottom headline and top headline define the positioning and zoom amount of the head buffer bounding box within the head frame.

Figure 14:
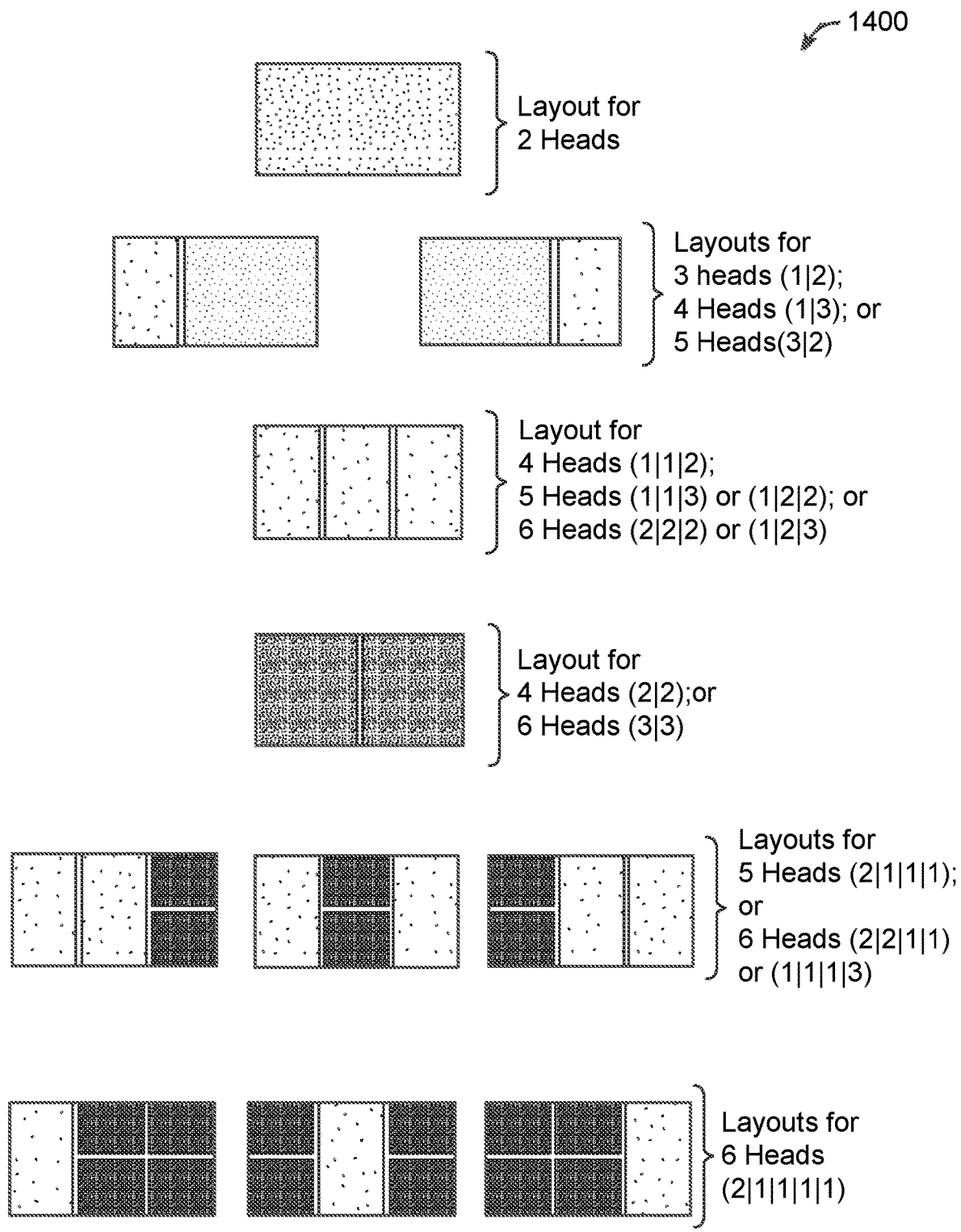
FIG. 14 shows examples of layouts.

FIG. 14 shows examples of layouts (1400). The layouts specify the location of the frames within the output image and the templates that form the frame. In FIG. 14, the number before the word "head" specifies the number of heads in the room. The numbers in the braces (i.e., "(" and ")") specify the number of people in each subset, whereby subsets are differentiated from each other in the braces using the "|" character. Thus, "4 person (1|1|2)" means four people are in the room with two individuals that are not proximate to any other individual and two individuals that are proximate to each other.

Layouts may include a mixture of templates of different frame types. For example, for five people organized as an individual and then two subsets with two people each, the layout includes a three single column proximity frames. If the five people are organized with two subsets, the first subset having three people and the second subset as having two people, then the proximity frame includes a single column proximity frame and a merged two thirds column proximity frame.

Different layouts may be defined for different orderings of same collection of subsets within the room. For example, if the room as a first subset of two people proximate to each other, then two individuals who are not proximate to anybody, then a second subset of two people, the layout may be different than if the two individuals are not between the first and second subsets. Thus, in at least some implementations, the proximity grouping, and ordering is performed prior to selecting the layout.

Although a maximum of six people is described, the templates and layouts may cover any number of individuals.

Figure 15:
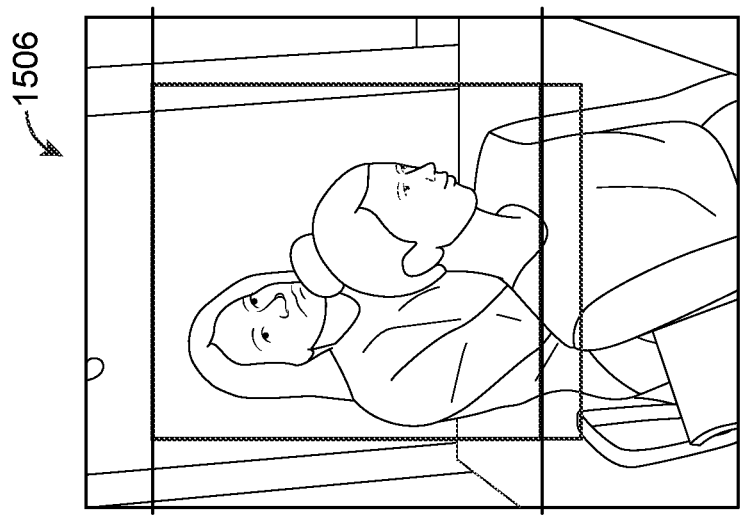
FIG. 15 show examples of generating a head frame definition using a proximity buffer bounding box.
Figure 15:
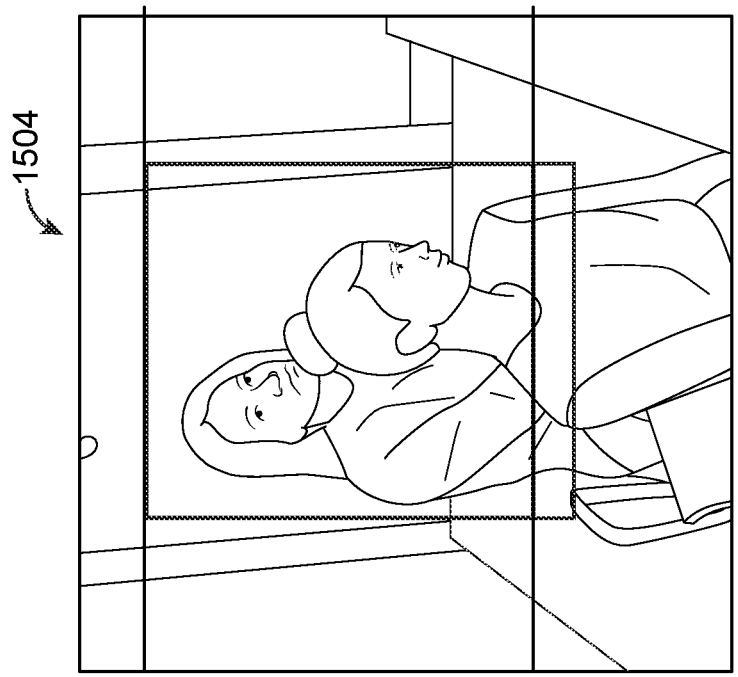
Figure 15:
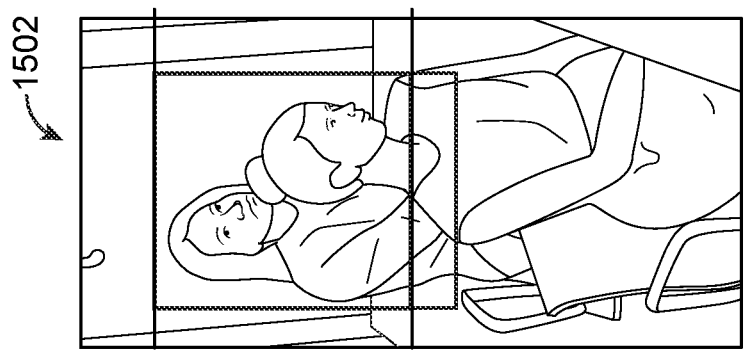

FIG. 15 shows an example of how the same sub-image of an input image may fill the different proximity frames (1502, 1504, 1506) based on the different templates. Proximity frame (1502) is a single column proximity frame. Proximity frame (1504) is a merged two thirds column proximity frame. Proximity frame (1506) is a half column proximity frame. As shown, the proximity square is aligned with the top headline and bottom headline. To perform the alignment a zoom level may be applied to the sub-image. Further, portions of the input image with the zoom level applied is included to fill in the rest of the frame as defined by the template.

Figure 16:
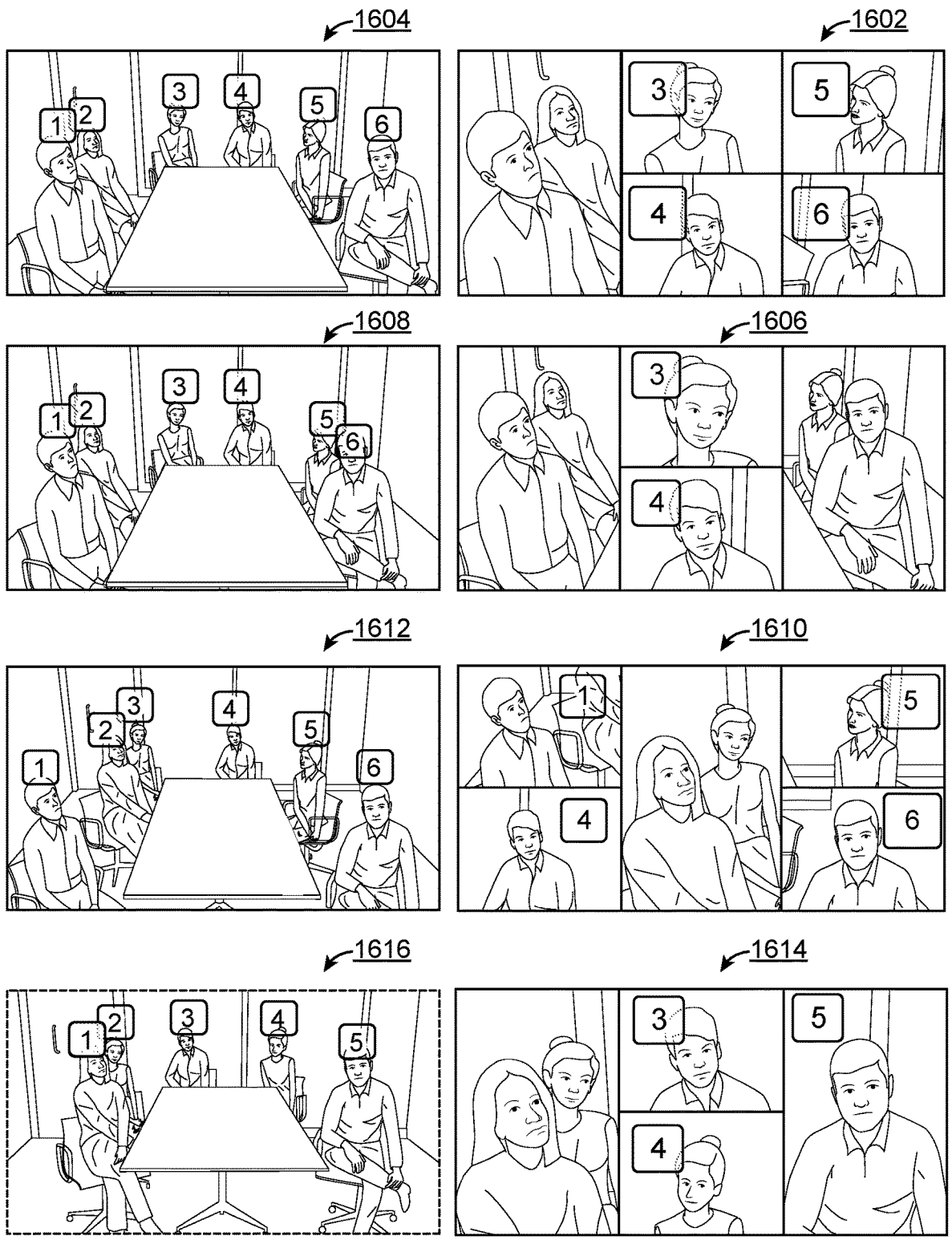
FIG. 16 shows examples of assigning buffer bounding boxes to locations in the image frame.

FIG. 16 show examples of assigning buffer bounding boxes to locations in a layout. As discussed above, the layout generation and assignment are a multiple step process. In a first step, when a proximity frame is identified, the video stream is divided into columns. The division into column is based on the number of individuals in the room. A table that relates a number of columns to a number of participants may be created and used.

In a second step, from the input image of the input video stream, a determination is made whether the left-most or right-most person is in a subset proximate to one or more other people. Namely, a determination is made whether a proximity frame is to be generated that includes the left-most or right-most person. If a proximity frame is to be generated, then the proximity frame is left-most in the layout if the proximity frame includes the left-most person and right-most in the layout if the proximity frame includes the right-most person. If not, the proximity frame is added to the middle column.

In the third step, the remaining frames, which are head frames, are assigned to individuals as follows. The video processing system may scan people from left to right. The video processing system assigns the people in the scanned order to head frames in the input image from left to right and top to bottom. Adjacent people in the conference room may be stacked in the layout of the output image.

Other assignments may be used without departing from the scope of the technology. For example, arrange may be based on the depth of the room or to first fill in the top row of the layout and then fill in the bottom row of the layout.

Further, additional columns may be added, and similar rules may be applied for the additional columns. Namely, the proximity frame may be allocated the position in the output image based on the position in the of the proximate people in the room relative to the individual people. Individual people may then be assigned top to bottom left to right for the remaining positions of the layout.

Image frame (1602) shows an assignment for image (1604) having the proximity group on the left side. Image frame (1606) shows an assignment for image (1608) having a proximity group on the left side and a proximity group on the right side. Image frame (1610) shows an assignment for image (1612) having the proximity group on neither the right nor the left. Image frame (1614) shows an assignment for image (1616) having the proximity group on the left side and five people in the room.

Figure 17:
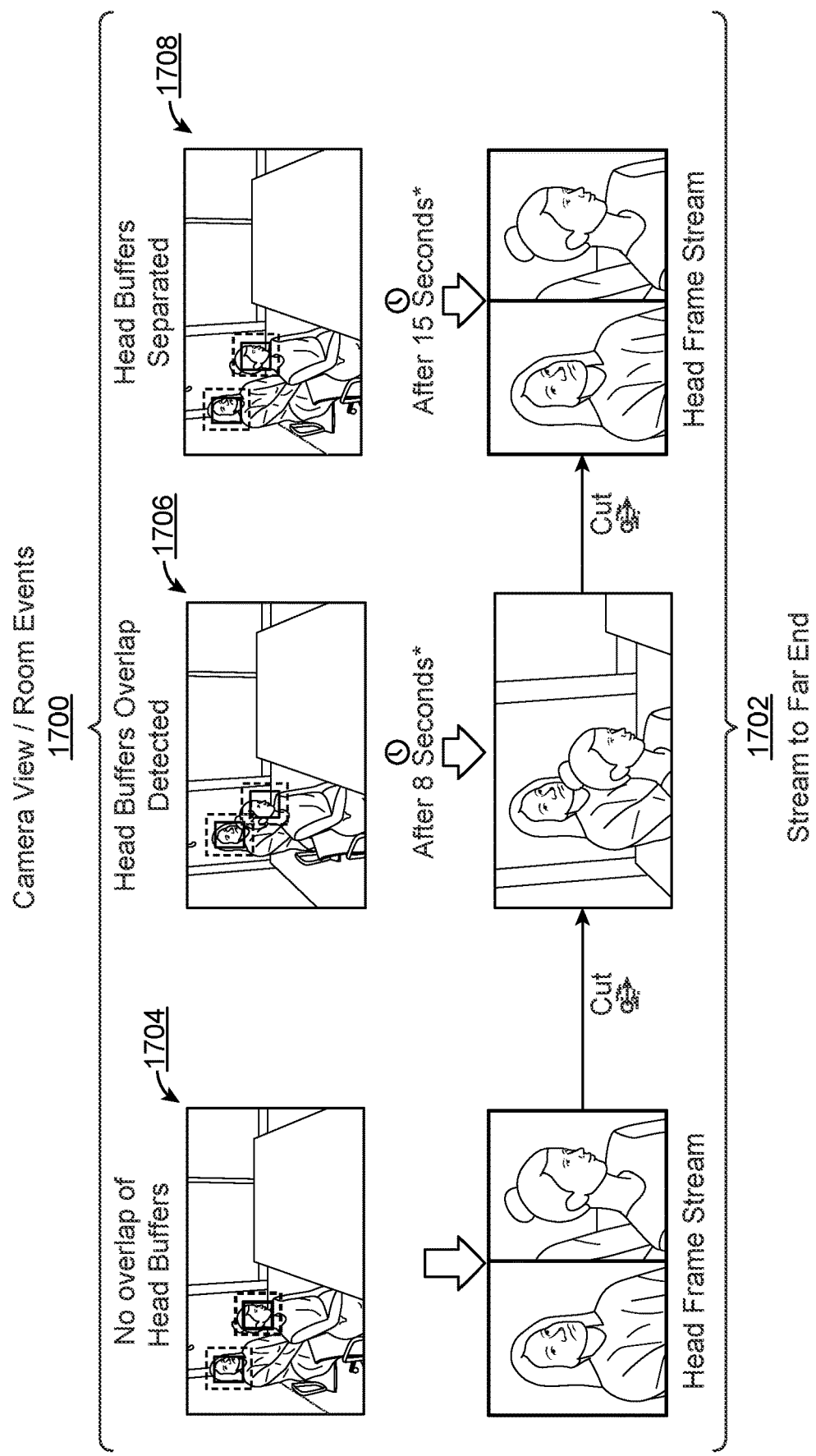
FIGS. 17 and 18 show examples of timing for reframing.

FIG. 17 shows when to reframe based on a person's movement in the video stream. The top row (1700) is the original image. The bottom row (1702) is the resulting proximity frame. The participants move in the conference room from left to right. At time 1704, the participants are far from each other in the conference room and, thus, have individual headframes. At time 1706, the participants move closer together and proximity detection is performed. In such a scenario, the system may wait a first threshold amount of time (e.g., 8 seconds) and then perform reframing to create a proximity frame. At time 1708, the participants separate from each other. The system may wait a second threshold amount (e.g., 15 seconds) of time and then perform reframing to revert back to the original head frames. The timers used are layout timers because the movements change the layout of the output image rather than just an individual frame. Individual reframing may be performed when a user moves within the frame or if the proximity detection does not detect a change in a group.

In the transitions, the purpose of the reframing is to refocus the frames on the person or subset. The thresholds are set to avoid flickering in the case a subset moves frequently while at the same time focusing on the people in the subset throughout the conference.

Figure 18:
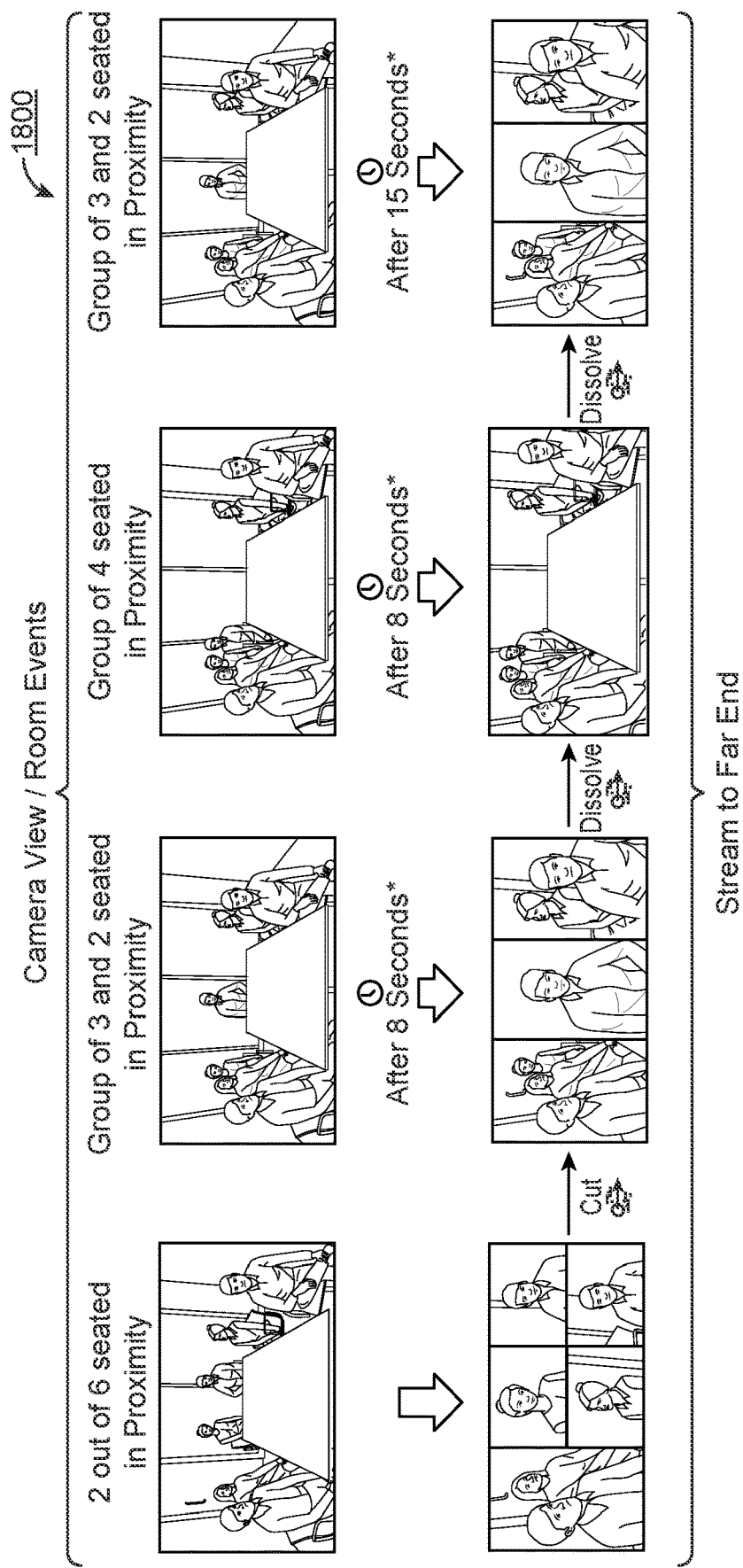

FIG. 18 shows another example of how the system may switch between different frames. In some embodiments, a proximity threshold is set for the proximity frame. The proximity threshold sets the maximum number of people that may be in a subset. In the case shown in FIG. 18, the proximity threshold is 3 indicating that a subset may have at most three people in a proximity frame. If more than three people, then the system may revert to a group framing as shown in the third column.

Figure 19:
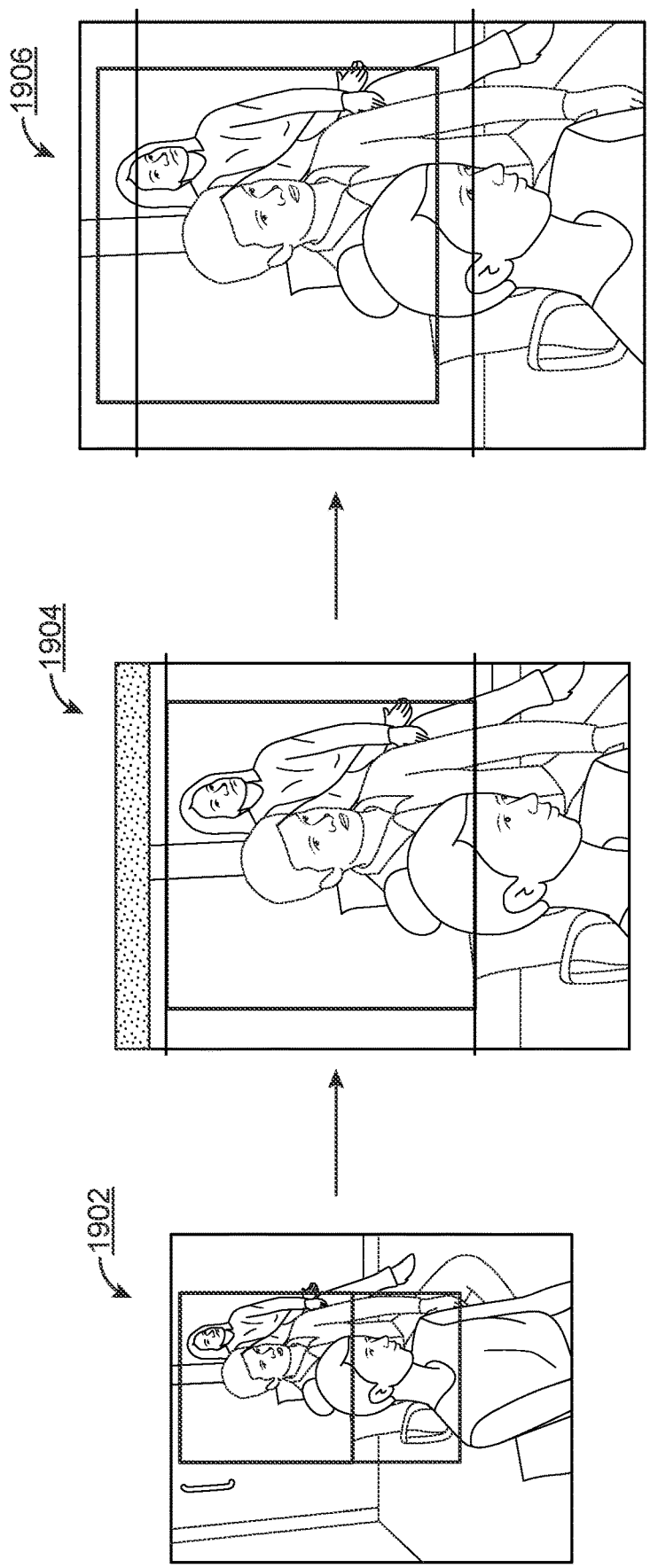
FIGS. 19 and 20 show examples for generating a head frame definition in cases in which using the template results in a portion extending beyond the image.

FIG. 19 shows an example of when using the template results in a portion of the proximity frame extending beyond the image. The base rule is to perform the operations described in the previous figures. The base rule is that the proximity square box is between the top and bottom headlines and the proximity square is centered horizontally in the frame. However, in some cases, applying the base rule causes the image to not fill the frame. For example, the camera view of the input image does not include a wide enough expanse.

A second rule is to shift the camera view to fill the frame. For example, the sub-image is shifted to include the proximity box and fill the blank space. Thus, the proximity square may no longer align with the top and bottom headlines or may not be centered in the frame. A third rule is applied if the second rule fails. the third rule specifies to perform zooming to increase the size of the proximity square to fill the frame. Applying the third rule causes the proximity square to be bigger than the area defined by the top and bottom headlines of the corresponding template.

FIG. 19 shows an example of applying the second rule to image (1902). The original proximity frame (1904) includes the area in which no image exists in the input image (i.e., the camera view shown on the left). In such a scenario, the view is shifted as shown in new proximity frame (1906) so that the proximity square box shown is no longer vertically centered in the frame.

Figure 20:
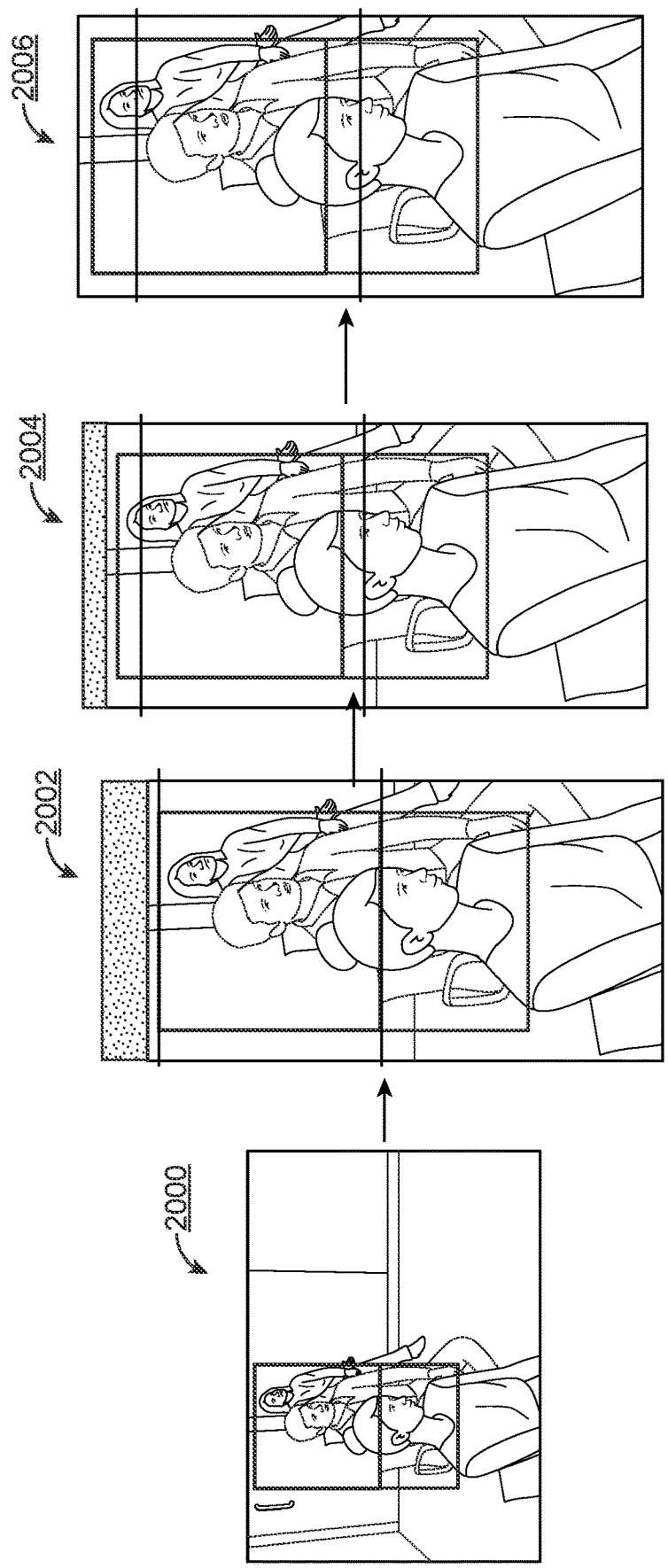

FIG. 20 shows an example of applying the third rule to portion of image (2000). In the original proximity frame (2002), a gap exists at the top of the frame in which no image exists in the input image (i.e., the camera view shown on the left). Applying the second rule helps fill the gap as shown in proximity frame (2004), but not completely. In such a scenario, the input image is zoomed in to fill the frame as shown in proximity image (2006). The zoom in is an additional zoom in over the zoom in to align the proximity square with the top and bottom headlines. Further, the headlines no longer align with the proximity square.

FIGS. 21-28 show examples of an input video stream and a resulting output video stream with various configurations of people in a room. Specifically, FIGS. 21-28 each show different examples of how an input image of an input video stream may be used to generate an output image that is added to a conference user interface to display to conference endpoints. In the examples starting with FIG. 21, the camera view (2102) in the middle of each of the Figures is the input image. The right side (2104) shows an example of the conference user interface. The conference user interface has multiple panes (2106, 2108, 2110, 2112) where each pane is for a different conference endpoint. In the example, the top left pane of the conference user interface is allocated to the conference endpoint of the conference room. The remaining panes are allocated to other endpoints. The generation of the head frames for filling in the conference pane is performed as described in the present application.

As shown, most of the unused area of the conference room is not shown in order to show a larger image of the people. Further, the focus is on the people. Thus, the conference participants may have a more interactive experience with each other regardless of whether they are in the same conference room.

Although the example slides show the allocation of the entire conference room to a single pane, each head frame may be allocated to a separate pane of the conference user interface. The allocation may be performed, for example, if the output image is a set of sub-images that are separated by frames. As another example, if the conference system that generates the conference user interface also generates the frames, then the conference system may assign each head, proximity frame, or group frame to a pane. Thus, the conferencing system may generate a conference user interface that allocates an equal size to the participants of the conference regardless of whether the participant is in the conference room. In such a scenario, the layout of the framing may be ignored in favor of the layout of the conference user interface.

Figure 21:
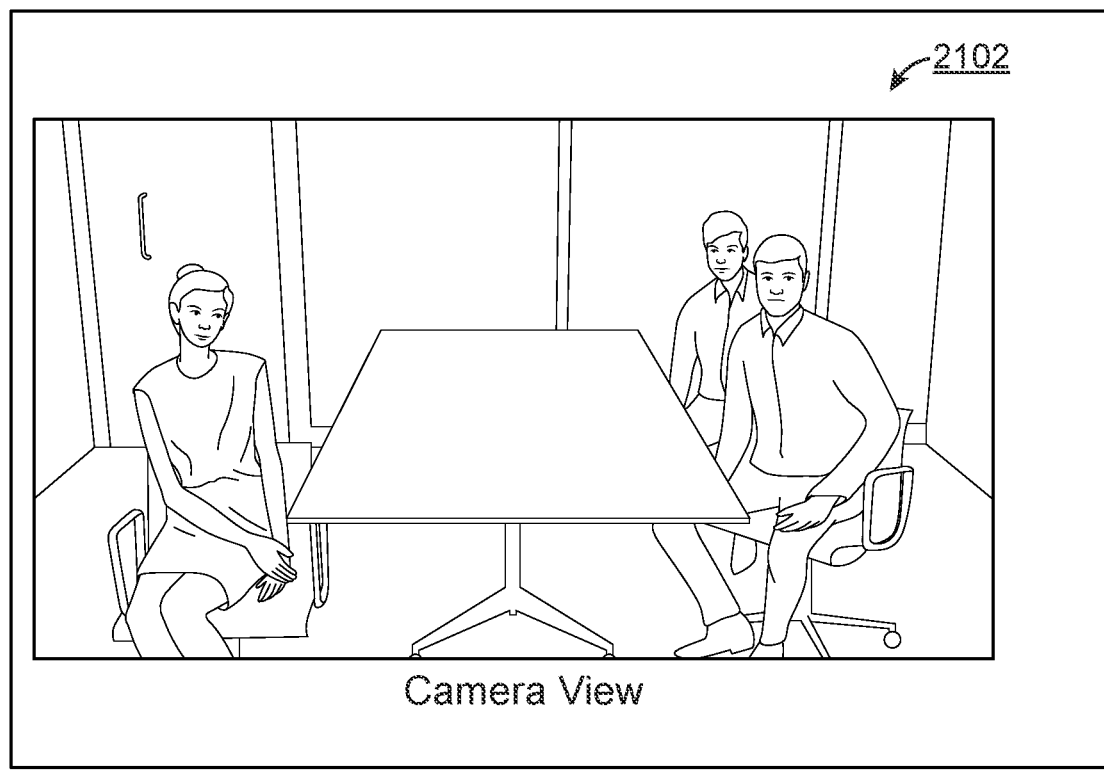
FIGS. 21, 22, 23, 24, 25, 26, 27, and 28 show examples in accordance with one or more embodiments.
Figure 21:
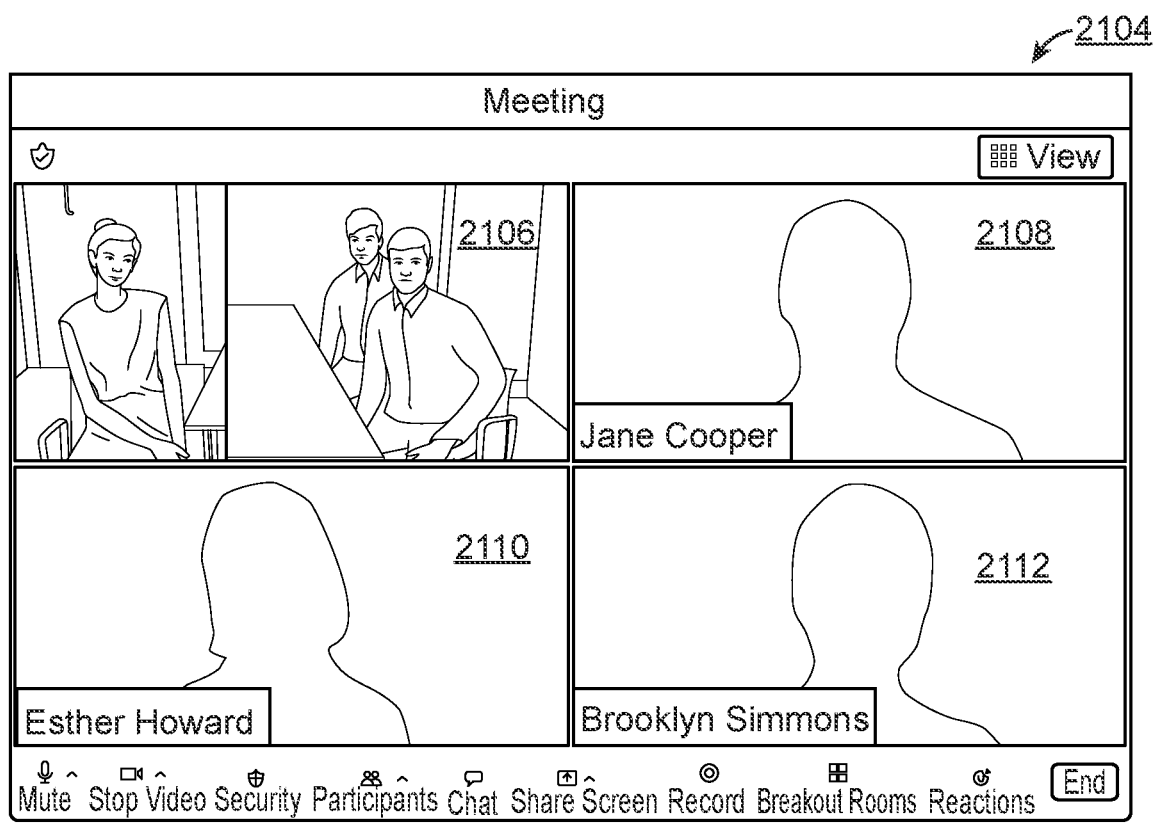

FIG. 21 shows the example with the output image of the video processing system when a single person and a subset of two people are in a room (2102). As shown in pane (2106) of conference interface (2104), a headframe is created for the single person that is separate from the two people and a proximity frame is created for the two people. The two frames are allocated a same amount of space in the layout.

Figure 22:
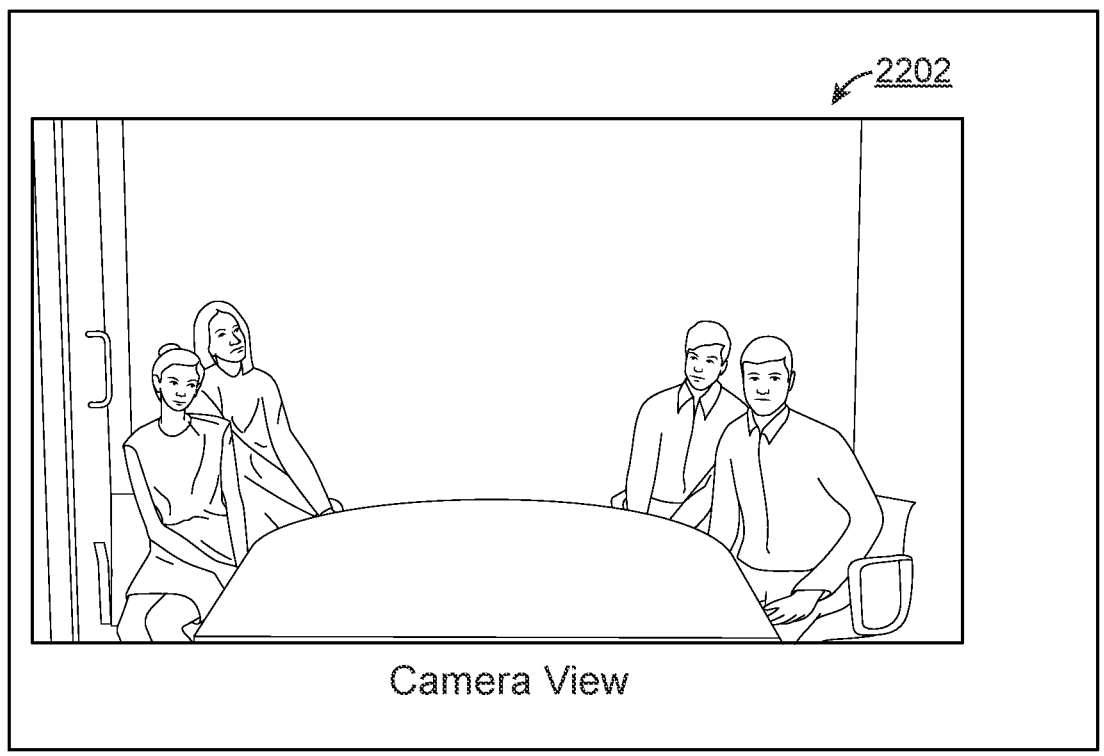
Figure 22:
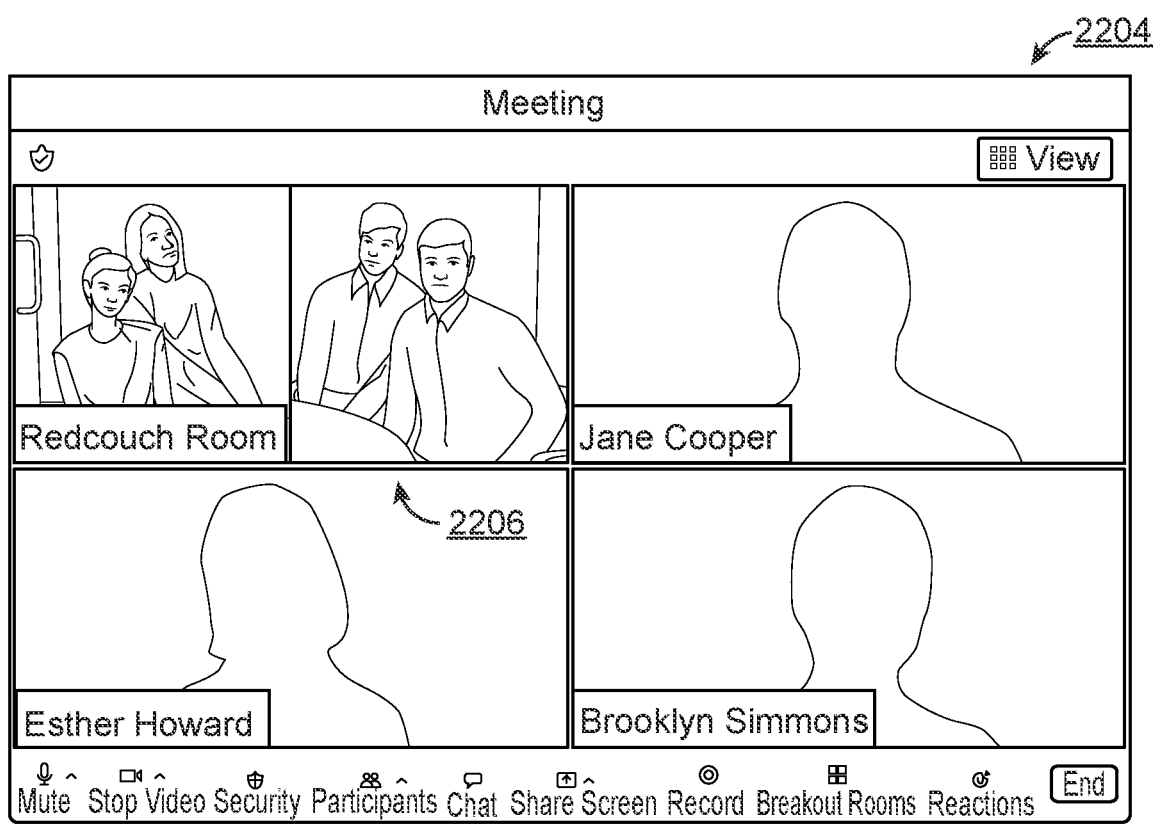

FIG. 22 shows the example with the output image (2206) in the interface (2204) of the video processing system when two subsets of people proximate to each other are in the conference room as shown in image (2202). Each subset has an equal number of people. Further, each subset has two people. Two proximity frames are created and allocated a same amount of space in the layout.

Figure 23:
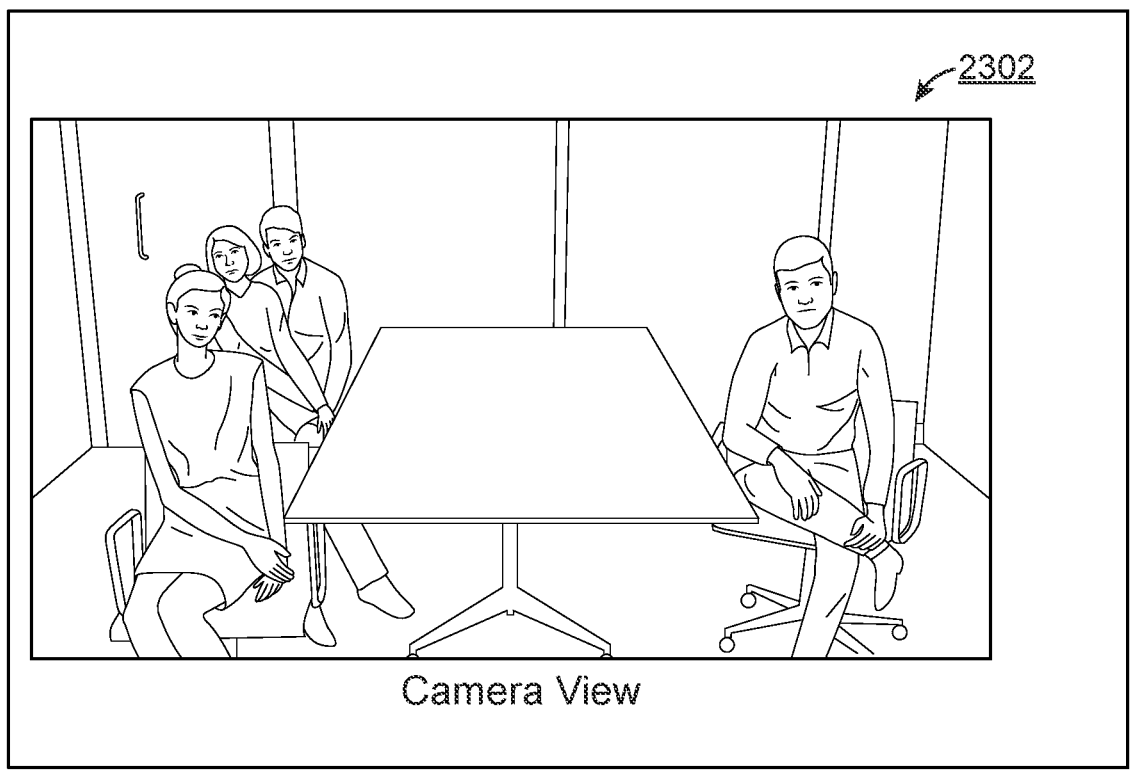
Figure 23:
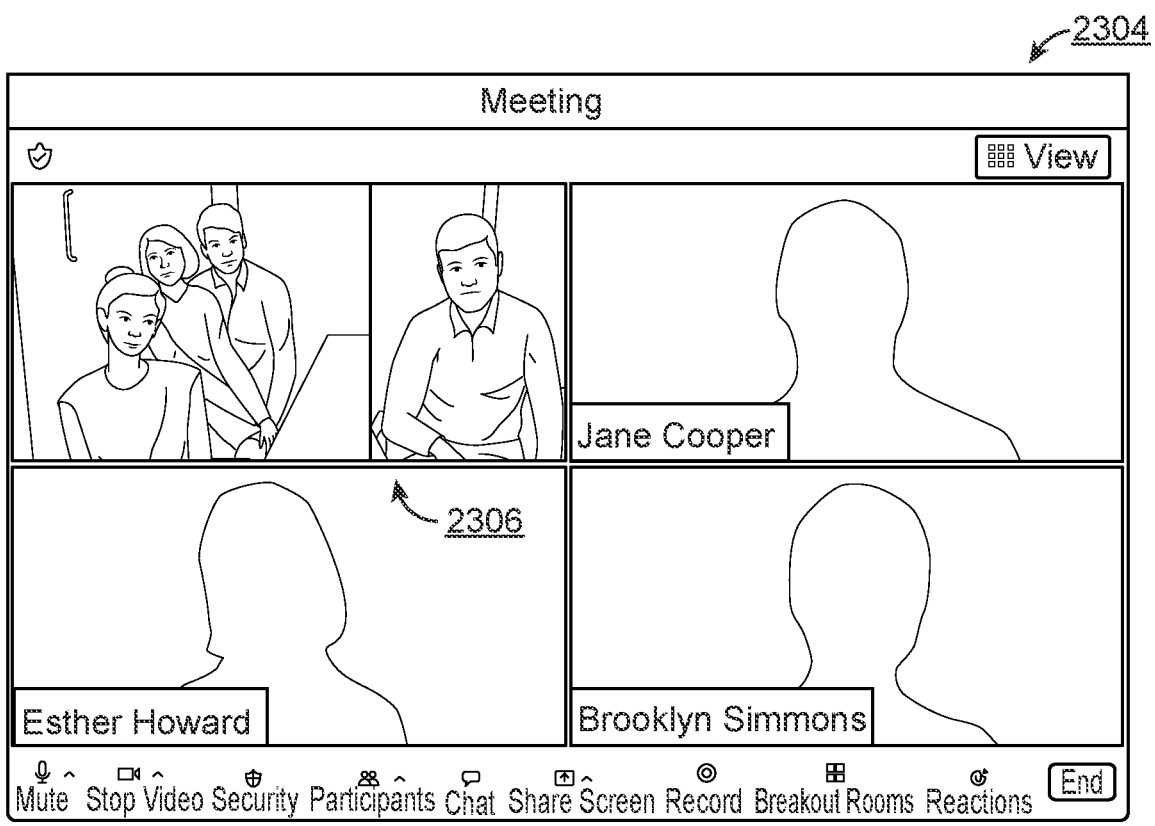

FIG. 23 shows the example of the output image (2306) in the interface (2304) of the video processing system when a single person and a subset of three people are in a room (2302). A single head frame is created for the single person that is separate from the three people and a proximity frame is created for the three people. The two frames are allocated different areas in the layout based on the relative number of people.

Figure 24:
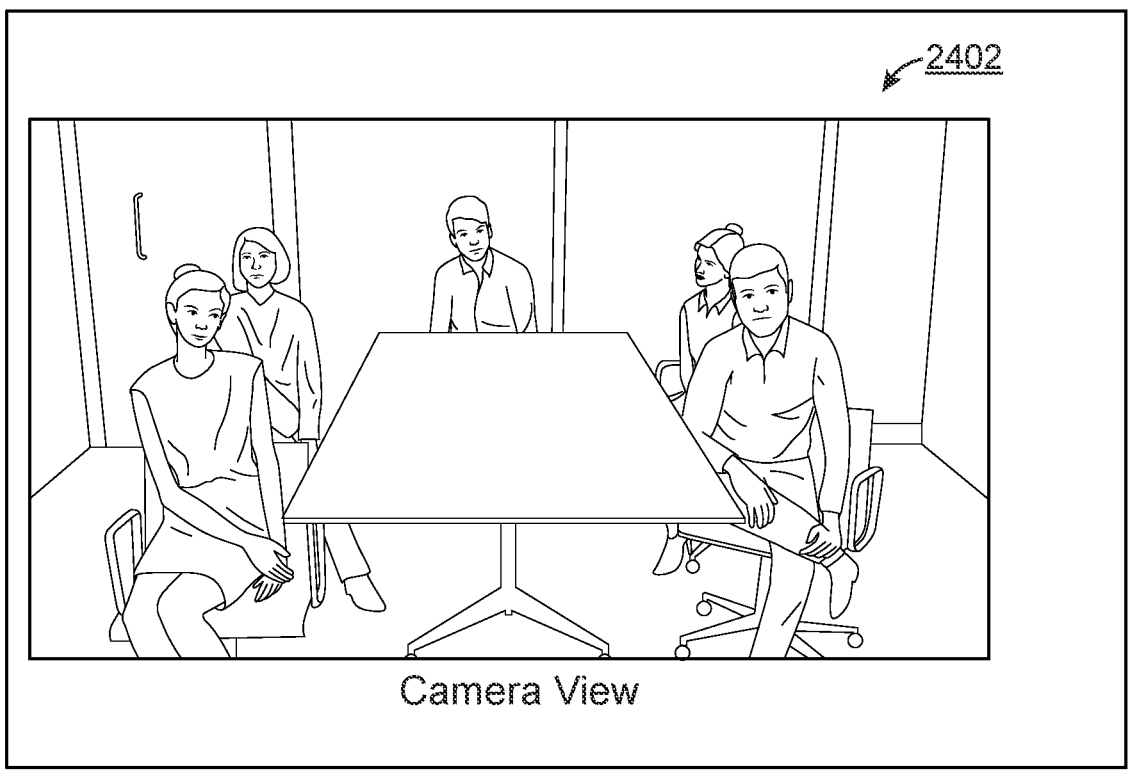
Figure 24:
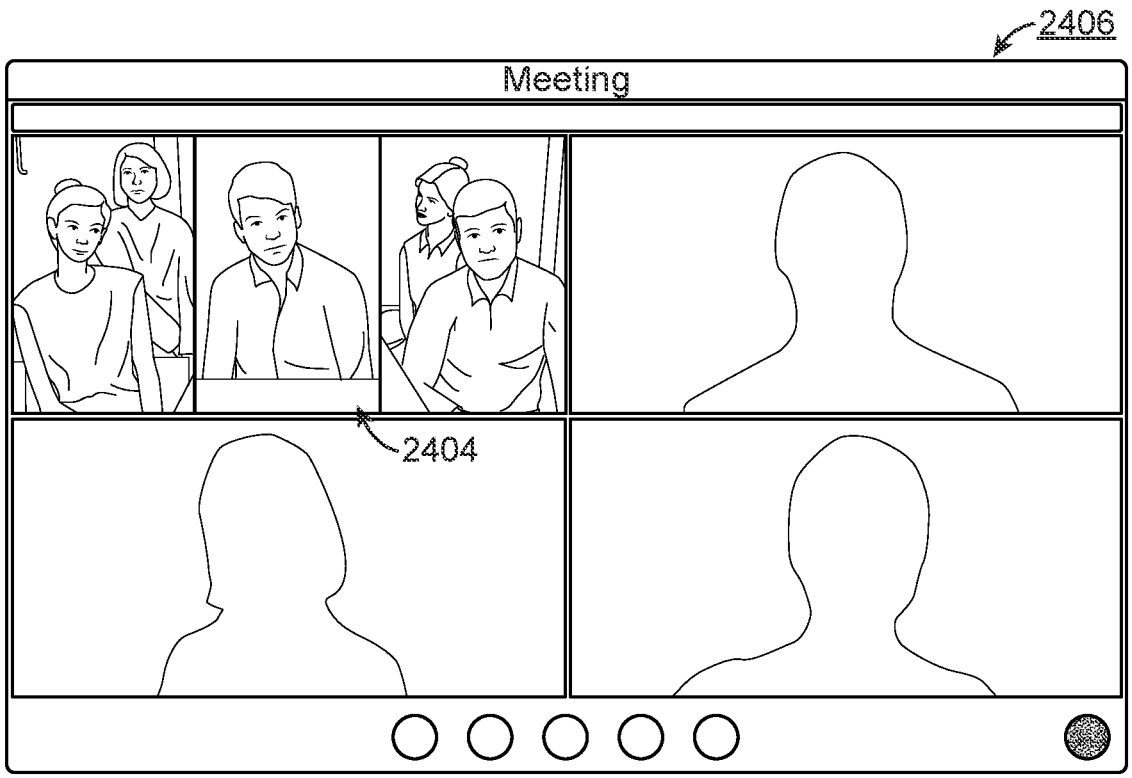

FIG. 24 shows the example of the output image (2404) in the interface (2406) of the video processing system with two subsets of people that are proximate to each other and a third person in between that is separate in the room (2402). A proximity frame is generated for each of the two subsets, and a single head frame is generated for the individual, whereby the single head frame is between the proximity frames.

Figure 25:
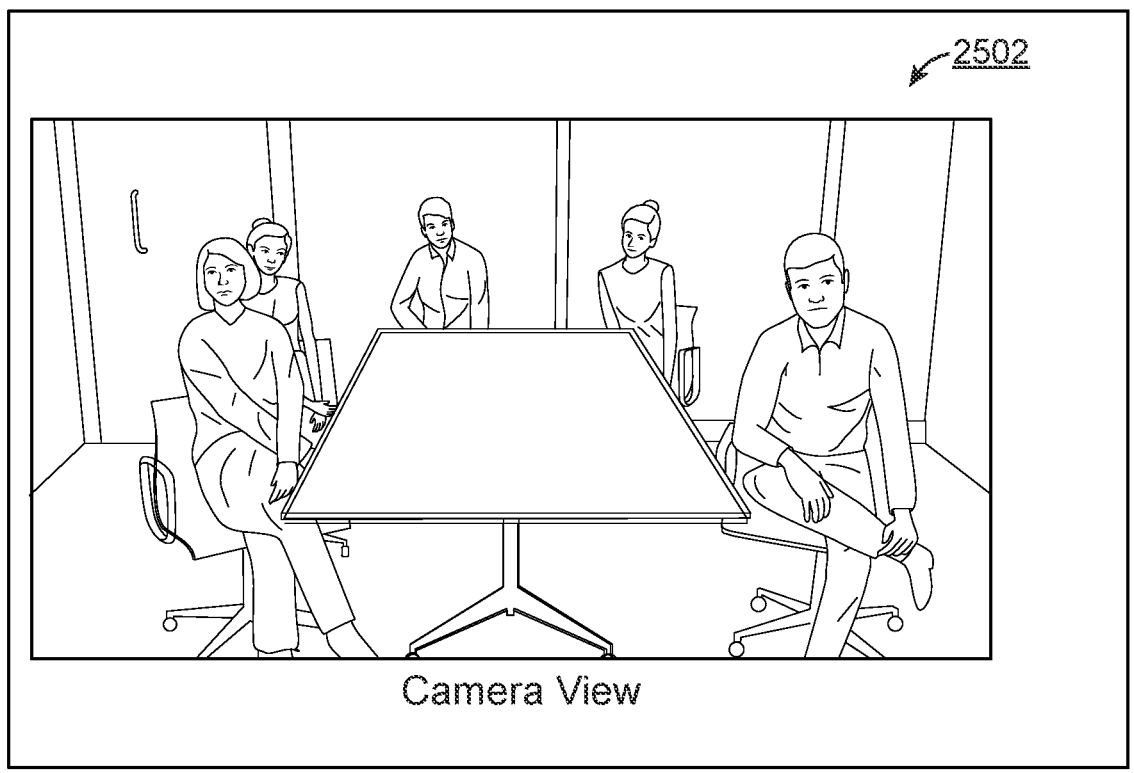
Figure 25:
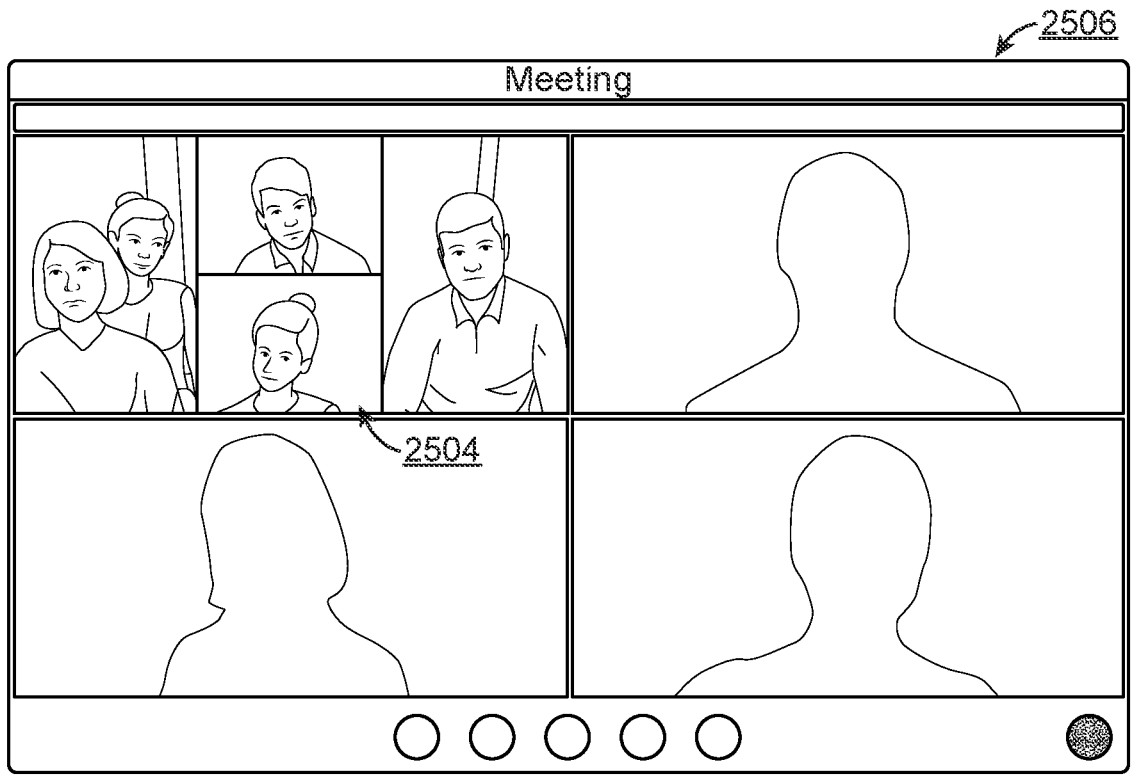

FIG. 25 shows the example of the output image (2504) in the interface (2506) of the video processing system with two people that are proximate to each other, one person on the right, and two people in between that are separate from everyone in the room (2402). A proximity frame is generated for the proximity group, and single head frames are generated for the individuals, and one individual is in a column size frame.

Figure 26:
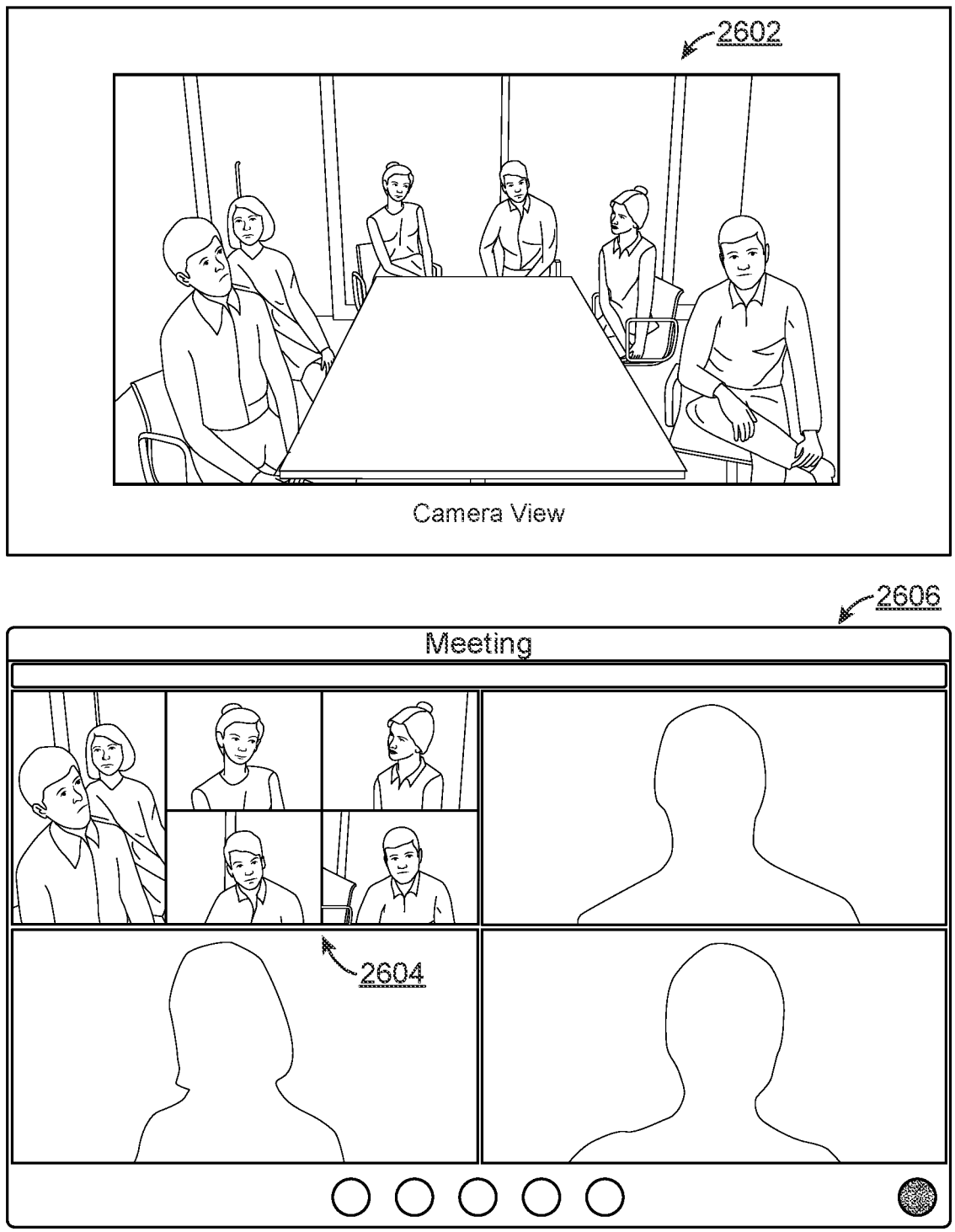

For FIG. 26, consider the scenario in which another person enters the room (2602) from FIG. 25. As shown in the output image (2604) of the interface (2606), the single headframe column is divided into two rows to accommodate the new single head frame.

Figure 27:
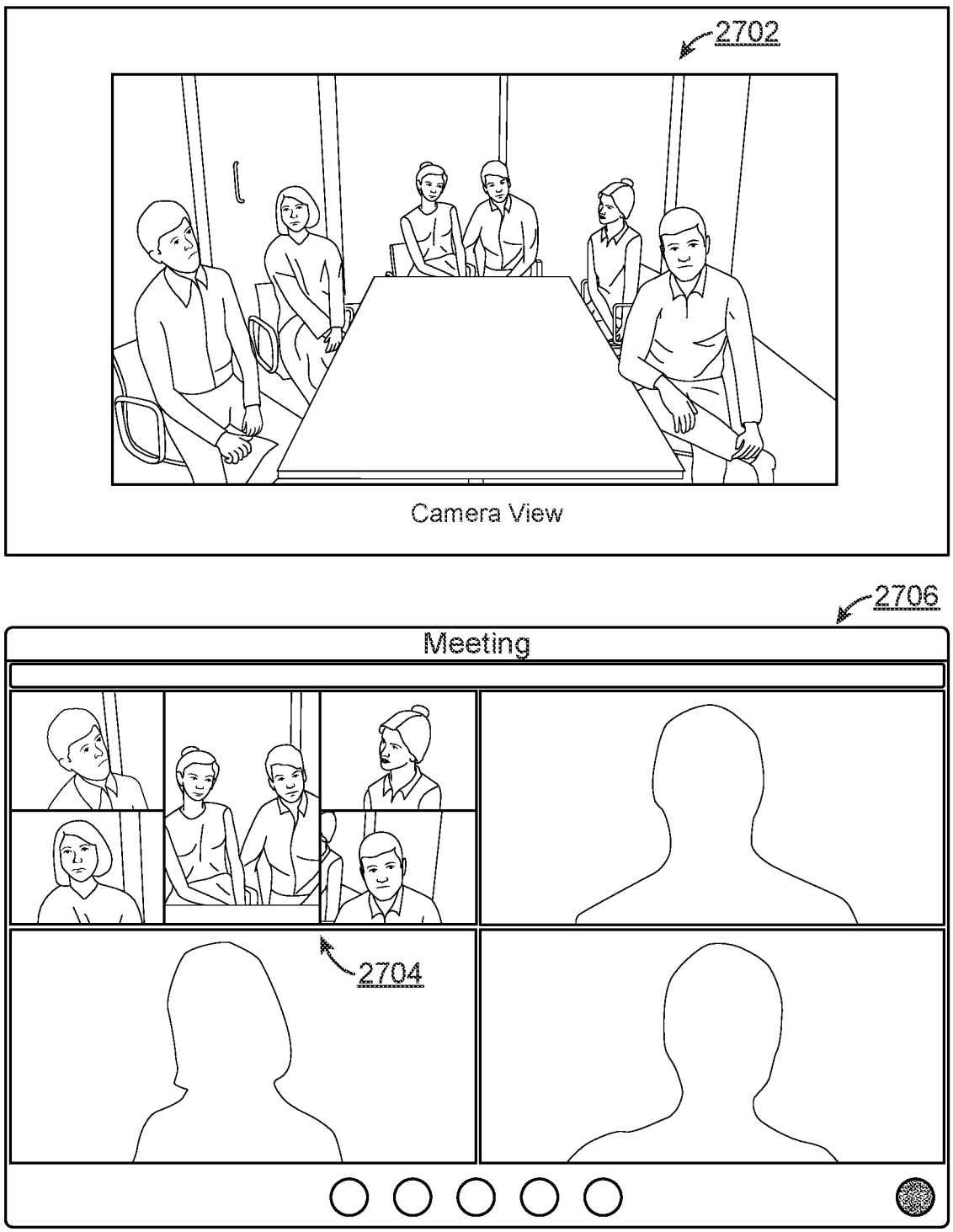

FIG. 27 shows an example of the output image (2704) of the interface (2706) with six people in the room (2702). The proximity group is in the middle. Thus, the proximity frame is in the middle with the single head frames on either side of the proximity frame.

Figure 28:
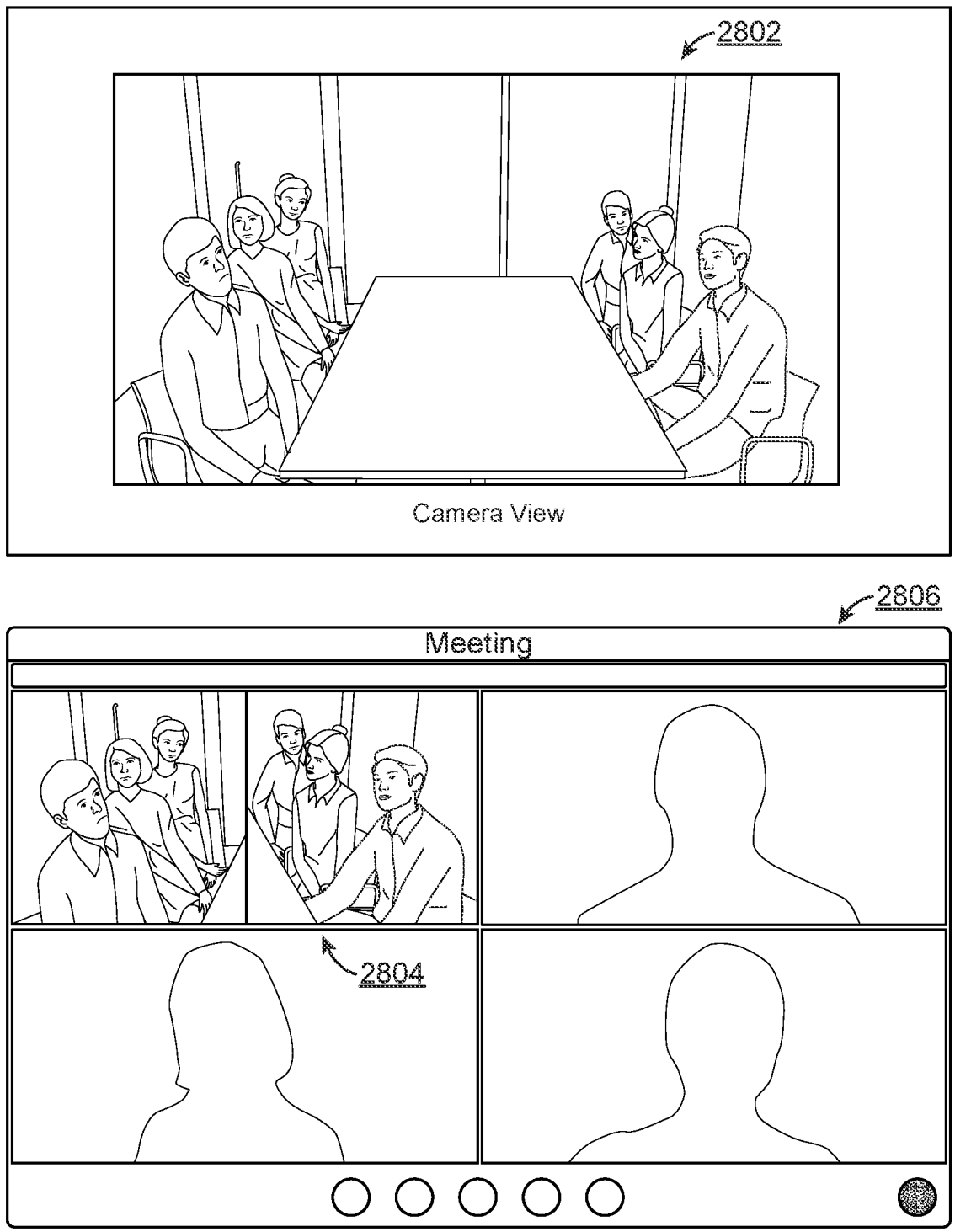

FIG. 28 shows an example of the output image (2804) of the interface (2806) with six people in the room (2802). The six people are in different proximities to each other than FIG. 27. Because the proximity groups have a same number of heads, the proximity frames are the same size and only have two columns.

One or more embodiments also consider events related to the head framing and trigger re-timings responsive to people moving in the room. The embodiments also consider related head framing events and consequent timings and behaviors to respond to peoples' movements and keep people's composition in frame with minimal distraction.

The framing may be used in a case of a hybrid mode of a conference meeting. In a hybrid mode, some people of the conference have their own conference endpoints while other people of the conference are in a conference room in which the conference endpoint is shared across the conference room. For example, when people join in conference meeting from home, they get a dedicated camera showing a single video of them. In contrast, when people gather in a conference room in office for meetings, there will be a single video that shows the entire in-room with multiple participants. This leads to meeting inequality in hybrid meetings. The meeting inequity is that the people at home are allocated a larger percentage space in a conference user interface than the people in the conference room. Further, the conference room may further have larger areas than the person at home in which no person is located. Namely, the camera in the conference room may capture a larger amount of unused space than the dedicated camera. The framing described herein may reduce or eliminate the meeting inequity by reducing the unused space and focusing the video stream on the participants. Thus, the framing may be used in a case of real-time, live meeting between participants.

Figure 29:
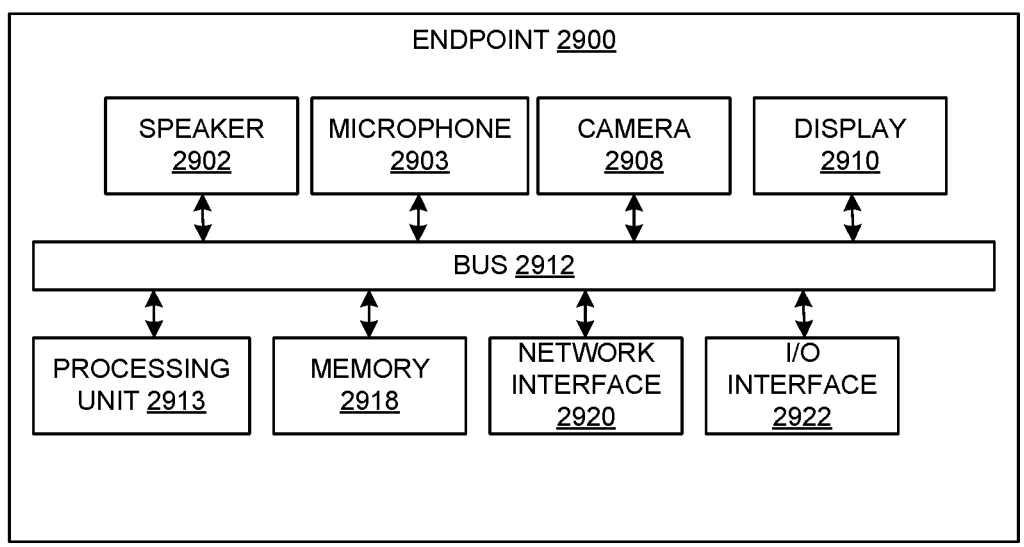
FIG. 29 shows an endpoint in accordance with one or more embodiments.

FIG. 29 shows an example of an endpoint (2900). The endpoint (2900) is used to participate in video conferences. Embodiments of the endpoint (2900) include video conferencing apparatuses, which may include mobile phones, laptop computers, desktop computers, tablet computers, video bars, etc. The endpoint (2900) of FIG. 29 communicates with one or more remote endpoints over a network using the network interface (2920). The endpoint (2900) includes multiple hardware and software components.

The speaker (2902) converts electrical audio signals into corresponding sound that may be heard by the users of the endpoint (2900). The speaker (2902) may be one of multiple speakers that are part of the endpoint (2900).

The microphone (2903) converts sound to corresponding electrical audio signals. The sound includes the speech of the users of the endpoint (2900). The microphone (2903) may be one of multiple microphones that are part of the endpoint (2900).

The camera (2908) converts light to corresponding electrical images and video. In one embodiment, the camera includes joints and motors to control the direction the camera is pointing and the amount of zoom of the camera. The camera (2908) may be one of multiple cameras that are part of the endpoint (2900).

The display (2910) converts electrical signal to corresponding images that may be viewed by users of the endpoint (2900). In one embodiment, the display (2910) may be a touch sensitive display that converts touch inputs from a user to electrical signals. The display (2910) may be one of multiple displays that are part of the endpoint (2900).

The bus (2912) is a communication system that transfers data between the components inside the endpoint (2900). The bus (2912) may use electrical or optical signals to transfer data between the components.

The processing unit (2913) is a collection of digital circuits that process the data and information captured and used by the endpoint (2900). The processing unit (2913) may include one or multiple processors. The processing unit (2913) executes the programs stored in the memory (2918). The programs include software instructions in the form of computer readable program code that, when executed, cause the endpoint (2900) to perform the operations of the embodiments of the disclosure.

The memory (2918) is a collection of circuits that are used to store information used by endpoint (2900). The memory (2918) stores programs and data that are executed and used by the processing unit (2913). The memory (2918) may include volatile memory and nonvolatile memory.

The network interface (2920) is the point of connection between the endpoint (2900) and other networks and endpoints. The network interface (2920) may include interfaces for wired networks (e.g., ethernet) and wireless networks (e.g., wireless local area network (WLAN), mobile phone networks, etc.).

The input/output (I/O) interface (2922) is the point of connection between the endpoint (2900) and I/O devices. The input/output (I/O) interface (2922) may include physically connected interfaces (e.g., universal serial bus (USB)) and wireless interfaces (e.g., personal area networks (PAN)). The input/output (I/O) interface (2922) may connect the endpoint to keyboards and mice, as well as to additional speakers, microphones, cameras, displays, etc.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    obtaining, using a head detection model (112) and for an image of a video stream (104), head detection information, wherein the head detection information identifies a plurality of heads detected in the image (501);
    obtaining a plurality of buffer bounding boxes, wherein obtaining the plurality of buffer bounding boxes comprises:
        obtaining a plurality of head buffer bounding boxes for the plurality of heads detected in the image, and
        combining at least two of the plurality of head buffer bounding boxes into a proximity buffer bounding box (503);
    identifying a set of templates (400) based on the plurality of buffer bounding boxes (505);
    creating, individually, a plurality of head frame definitions for the plurality of buffer bounding boxes using the set of templates (507);
    generating an image frame definition that combines the plurality of head frame definitions (617); and
    processing the video stream using the image frame definition (621).

2. The method of claim 1, wherein obtaining the plurality of buffer bounding boxes comprises:
    making a detection that the at least two of the plurality of head buffer bounding boxes are vertically adjacent in the image, wherein combining the at least two of the plurality of head buffer bounding boxes is based on the detection.

3. The method of claim 1, wherein obtaining the plurality of buffer bounding boxes comprises:
    making a detection that the at least two of the plurality of head buffer bounding boxes are at least one of within a threshold distance and overlapping to each other in the image, wherein combining the at least two of the plurality of head buffer bounding boxes is based on the detection.

4. The method of claim 1, further comprising:
    obtaining, from the head detection information, a plurality of head detection bounding boxes for the plurality of heads detected in the image; and
    adding a buffer around in the plurality of head detection bounding boxes to obtain the plurality of head buffer bounding boxes.

5. The method of claim 1, wherein combining the at least two head buffer bounding boxes comprises:
    generating a proximity buffer bounding box around the at least two head buffer bounding boxes;
    generating a square region within the proximity buffer bounding box,
    wherein the square region is aligned to a template in the set of templates.

6. The method of claim 5, further comprising:
    aligning a top of the square region to a top headline and a bottom of the square region to a bottom headline of the template to generate a head frame definition of the plurality of head frame definitions.

7. The method of claim 6, wherein aligning comprises defining a zoom amount for the buffer bounding box.

8. The method of claim 6, further comprising:
    determining, after aligning, that the head frame definition specifies a region not in the image;
    adjusting at least one of a zoom amount and a location specified in the head frame definition to exclude the region.

9. The method of claim 5, wherein the proximity buffer bounding box comprises:
    a top edge matching a top edge of a topmost head buffer bounding box of the at least two head buffer bounding boxes,
    a bottom edge matching a bottom edge of a bottom most head buffer bounding box of the at least two head buffer bounding boxes,
    a left edge matching a left edge of a left most head buffer bounding box of the at least two head buffer bounding boxes, and
    a right edge matching a right edge of a right most head buffer bounding box of the at least two head buffer bounding boxes.

10. The method of claim 1, further comprising:
    defining a plurality of columns for a layout based on a number of heads detected in the image;
    assigning the proximity buffer bounding box to a first column of the plurality of columns, the column matching a location of at least two head buffer bounding boxes; and
    assigning at least one remaining buffer bounding box of the plurality of bounding boxes to at least one remaining column of the plurality of columns.

11. The method of claim 9, wherein assigning the at least one remaining buffer bounding box comprises:

assigning a subset of the plurality of head buffer bounding boxes to a second column of the layout.

12. The method of claim 9, further comprising:
determining, after assigning the at least one remaining buffer bounding boxes, that a column of the plurality of columns is empty; and
expanding the first column responsive to determining that the column is empty.

13. The method of claim 11, wherein the first column is expanded based on the proximity buffer bounding box having a greatest number of heads of the plurality of heads.

14. The method of claim 1, wherein creating the plurality of head frame definitions comprises:
selecting a buffer bounding box of the plurality of buffer bounding boxes to obtain a selected bounding box,
creating a head frame definition for the selected bounding box using a template in the set of templates, the template corresponding to a location assigned to the buffer bounding box, and
adding the head frame definition to the image frame definition.

15. The method of claim 1, further comprising:
monitoring the video stream for movement of the plurality of heads.

16. A system comprising:
a video processor (106) comprising:
a head detection model (112) configured to generate head detection information for an image of a video stream, wherein the head detection information identifies a plurality of heads detected in the image,
a frame generator (116) configured to generate a plurality of head frame definitions for an image of an input video stream, wherein generating the plurality of head frame definitions comprises:
obtaining, using a head detection model and for an image of a video stream, head detection information, wherein the head detection information identifies a plurality of heads detected in the image;
obtaining a plurality of buffer bounding boxes, wherein obtaining the plurality of buffer bounding boxes comprises:
obtaining a plurality of head buffer bounding boxes for the plurality of heads detected in the image, and
combining at least two of the plurality of head buffer bounding boxes into a proximity buffer bounding box;
identifying a set of templates based on the plurality of buffer bounding boxes;
creating, individually, the plurality of head frame definitions for the plurality of buffer bounding boxes using the set of templates; and
an image framing processor (114) configured to process the video stream using the image frame definition.

17. The system of claim 15, further comprising:
a camera (102) for capturing the video stream (104).

18. The system of claim 16, wherein the video processor (106) is within a housing of the camera (102).

19. The system of claim 15, wherein the video processor (106) further comprises:
a plurality of timers (124) to trigger reframing of the plurality of head frame definitions.

20. A method comprising:
obtaining, using a head detection model and for an image of a video stream, head detection information, wherein the head detection information identifies a plurality of heads detected in the image;
obtaining a plurality of buffer bounding boxes, wherein obtaining the plurality of buffer bounding boxes comprises:
obtaining a plurality of head buffer bounding boxes for the plurality of heads detected in the image, and
combining at least two of the plurality of head buffer bounding boxes into a proximity buffer bounding box;
identifying a set of templates based on the plurality of buffer bounding boxes;
creating, individually, a plurality of head frame definitions for the plurality of buffer bounding boxes; and
processing the video stream using the plurality of head frame definitions.

* * * * *